US012627215B2

(12) United States Patent
Zhuang et al.

(10) Patent No.: US 12,627,215 B2
(45) Date of Patent: May 12, 2026

(54) CASCADED MULTI-PORT CONVERTER AND THREE-PHASE MEDIUM-VOLTAGE INPUT SYSTEM

(71) Applicant: Sungrow Power Supply Co., Ltd., Hefei (CN)

(72) Inventors: Jiacai Zhuang, Hefei (CN); Jun Xu, Hefei (CN); Yue Dong, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 230 days.

(21) Appl. No.: 18/029,401

(22) PCT Filed: Sep. 6, 2021

(86) PCT No.: PCT/CN2021/116650
§ 371 (c)(1),
(2) Date: Mar. 30, 2023

(87) PCT Pub. No.: WO2022/068531
PCT Pub. Date: Apr. 7, 2022

(65) Prior Publication Data
US 2023/0387780 A1 Nov. 30, 2023

(30) Foreign Application Priority Data

Sep. 30, 2020 (CN) .......................... 202011059741.9

(51) Int. Cl.
*H02M 1/00* (2007.01)
*H02M 3/335* (2006.01)

(52) U.S. Cl.
CPC ....... *H02M 1/007* (2021.05); *H02M 3/33573* (2021.05); *H02M 3/33584* (2013.01)

(58) Field of Classification Search
CPC .... H02M 1/007; H02M 1/0074; H02M 1/008; H02M 3/33573; H02M 3/33584; H02M 7/219
See application file for complete search history.

(56) References Cited

U.S. PATENT DOCUMENTS 8,223,520 B2 * 7/2012 Aso ................... H02M 3/33561
363/97
2005/0207180 A1 9/2005 Pansier
(Continued)

FOREIGN PATENT DOCUMENTS

CN 104078992 A 10/2014
CN 105490552 A 4/2016
(Continued)

OTHER PUBLICATIONS

CN109039081 Translation (Year: 2018).*
(Continued)

*Primary Examiner* — Crystal L Hammond
*Assistant Examiner* — Jennifer C Caulk
(74) *Attorney, Agent, or Firm* — Wolf, Greenfield & Sacks, P.C.

(57) ABSTRACT

A cascaded multi-port converter and a three-phase medium-voltage input system. Input terminals of the module units are cascaded. In each module unit: input ends of the high-voltage conversion units are cascaded, a magnetic core of a multi-winding transformer is wound with multiple primary windings and at least one secondary winding, an output end of each high-voltage conversion unit is connected to a corresponding primary winding, and the secondary winding is connected to an input end of a corresponding low-voltage rectifying unit. Therefore, the windings of the multiple high-voltage conversion units share the magnetic core, and the number of the multi-winding transformers and the number of the low-voltage rectifying units can be reduced, (Continued)

thereby reducing the volume, weight, and costs of the cascaded multi-port converter.

18 Claims, 20 Drawing Sheets

(56) References Cited

U.S. PATENT DOCUMENTS

| 2015/0263627 A1 | 9/2015 | Sagneri et al. |
| 2016/0065077 A1 | 3/2016 | Yamada |
| 2017/0214324 A1 | 7/2017 | Fujita et al. |
| 2017/0225580 A1 | 8/2017 | Oestreicher et al. |
| 2017/0271073 A1 | 9/2017 | Zeng et al. |
| 2019/0052177 A1 | 2/2019 | Lu et al. |
| 2019/0238088 A1 | 8/2019 | Zhuang et al. |
| 2021/0013812 A1* | 1/2021 | Huang ................. H02M 7/483 |

FOREIGN PATENT DOCUMENTS

| CN | 107204235 A | | 9/2017 |
| CN | 109039081 | * | 12/2018 |
| CN | 109039081 A | | 12/2018 |
| CN | 208299694 U | | 12/2018 |
| CN | 109391161 A | | 2/2019 |
| CN | 110165896 A | | 8/2019 |
| CN | 110828126 | * | 2/2020 |
| CN | 111355378 A | | 6/2020 |
| CN | 112217407 A | | 1/2021 |
| CN | 112217408 A | | 1/2021 |
| JP | S62-247758 A | | 10/1987 |
| JP | 2008-160948 A | | 7/2008 |
| JP | 2011-234564 A | | 11/2011 |
| JP | 2016-046959 A | | 4/2016 |
| JP | 2017-131086 A | | 7/2017 |
| JP | 2017-139948 A | | 8/2017 |
| JP | 2019-134665 A | | 8/2019 |

OTHER PUBLICATIONS

CN110828126 Translation (Year: 2020).*
Second Office Action for Chinese Application No. 202011059741.9, dated Jan. 6, 2022.
First Office Action for Japanese Application No. 2022-562780, mailed Nov. 20, 2023.
Zhang, Transformer. Electric Foundation. Beijing Postal University Press. Jun. 30, 2007:156.
PCT/CN2021/116650, Nov. 25, 2021, International Search Report and Written Opinion.
International Search Report and Written Opinion for International Application No. PCT/CN2021/116650, mailed Nov. 25, 2021.
Extended European Search Report for European Application No. 21874192.4, dated Sep. 11, 2024.

* cited by examiner

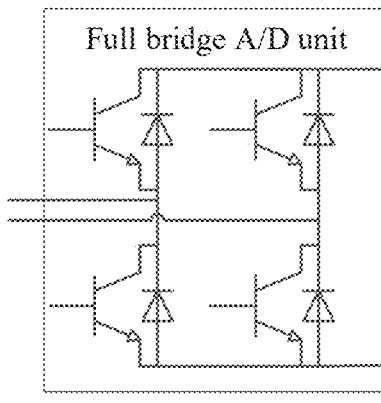
Fig. 9a
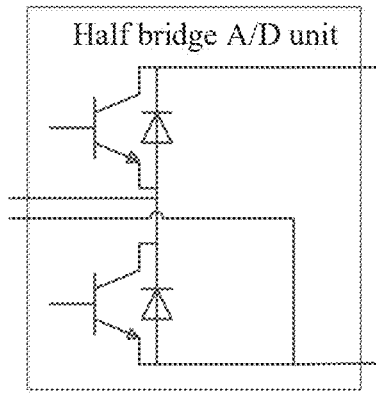
Fig. 9b
Fig. 9c

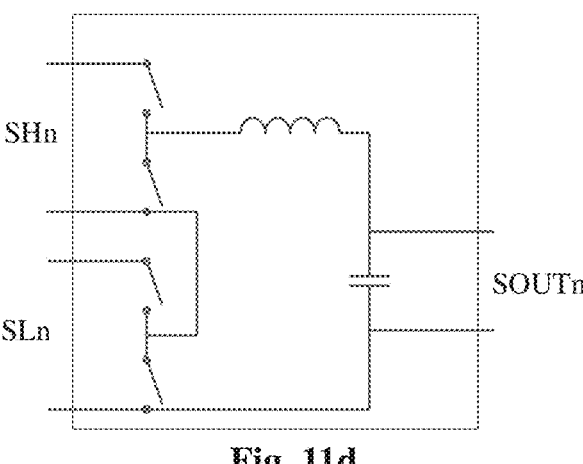
Fig. 11d
Fig. 11e
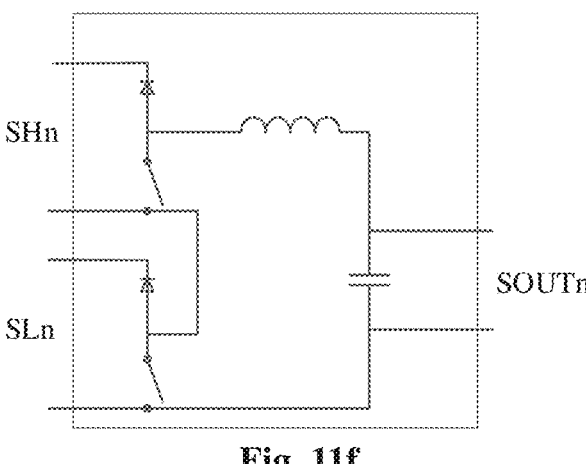
Fig. 11f

VoutH1

VoutH2

VoutH3

Vout

VoutL1

VoutL2

VoutL3

VoutH1

VoutH2

VoutH3

VoutL1

VoutL2

VoutL3

Vout

CASCADED MULTI-PORT CONVERTER AND THREE-PHASE MEDIUM-VOLTAGE INPUT SYSTEM

This application is a national stage filing under 35 U.S.C. 371 of International Patent Application Serial No. PCT/CN2021/116650, filed Sep. 6, 2021, which claims priority to Chinese Patent Application No. 202011059741.9, entitled "CASCADED MULTI-PORT CONVERTER AND THREE-PHASE MEDIUM-VOLTAGE INPUT SYSTEM", filed on Sep. 30, 2020 with the China National Intellectual Property Administration. The contents of these applications are incorporated herein by reference in their entireties.

FIELD

The present disclosure relates to the technical field of power electronics, and in particular, to a cascaded multi-port converter and a three-phase medium-voltage input system.

BACKGROUND

A conventional direct-current (DC) charging pile typically first converts a medium voltage to a mains voltage, for example, 380V in China, through a power-frequency step-down transformer, and then converts the mains voltage to a DC voltage, for example, 200 Vdc to 1000 Vdc for an electric vehicle through a power module, to charge the electric vehicle. As shown in FIG. 1, a primary winding of a power-frequency transformer is connected to a primary side high-voltage power supply, a secondary winding of the power-frequency transformer is connected to an alternating-current (AC) side of each DC charging pile module respectively, and a DC side (including Vout1, Vout2 . . . and Voutn shown in FIG. 1) of each DC charging pile module is connected to a charging port of the power module. Due to the requirements of safety regulations, in situations where multiple vehicles are allowed to be charged simultaneously, an input of the power module is required to be isolated from an output of the power module. Therefore, not only the power-frequency transformer is required to be arranged at a front stage of each DC charging pile module, but also an isolated DC/DC converter (such as isolated D/D shown in FIG. 1) is required to be arranged at a rear stage of an AC/DC converter (such as A/D shown in FIG. 1) in each DC charging pile module. As a result, the solution has defects such as self-loss at night and large volume.

Therefore, a cascaded power electronic transformer is provided in the conventional technology. As shown in FIG. 2, each module unit (such as, a module unit 1, a module unit 2 . . . or a module unit m shown in FIG. 2) includes a first AC/DC converter (such as, A/D-P1, A/D-P2 . . . or A/D-Pm shown in FIG. 2), a DC/AC converter (such as, D/A-P1, D/A-P2 . . . or D/A-Pm shown in FIG. 2), a transformer and a second AC/DC converter (such as, A/D-S12, A/D-S22 . . . or A/D-Sm2 shown in FIG. 2). An output end of each module unit is connected in parallel into a DC bus, and then connected to the charging port of the power module through an isolated DC/DC converter (including isolated DC/DC1, isolated DC/DC2 . . . isolated DC/DCn shown in FIG. 2). The charging ports are required to be isolated from each other, to ensure the safety of charging. In order to meet requirements of an input voltage, a large number of module units are required to be cascaded, and an output voltage of each cascaded module (i.e., the first AC/DC converter) is a safety voltage. In this solution, the large number of the cascaded modules results in the increase of the volume, weight and cost of the converter.

SUMMARY

In view of the above, a cascaded multi-port converter and a three-phase medium-voltage input system are provided according to embodiments of the present disclosure, which are used to reduce the number of cascaded modules units, to reduce the volume, weight and cost of the cascaded multi-port converter.

A cascaded multi-port converter is provided according to a first aspect of the present disclosure. The cascaded multi-port converter includes multiple module units and multiple low-voltage rectifying units. Each of the multiple module units includes at least one multi-winding transformer and multiple high-voltage conversion units. Input ends of the multiple module units are cascaded, and two terminals of the cascaded module units serve as two ports of an input end of the cascaded multi-port converter. In each of the multiple module units: input ends of the multiple high-voltage conversion units are cascaded, two terminals of the cascaded high-voltage conversion units serve as two ports of an input end of said module unit, a magnetic core of a multi-winding transformer is wound with multiple primary windings and at least one secondary winding, an output end of each of the multiple high-voltage conversion units is connected to a corresponding primary winding, and the secondary winding is connected to an input end of a corresponding low-voltage rectifying unit.

In an embodiment, the number of the multiple low-voltage rectifying units is the same as the number of all secondary windings, and all secondary windings are connected to input ends of the multiple low-voltage rectifying units in one-to-one correspondence.

In an embodiment, the number of the multiple low-voltage rectifying units is less than the number of all secondary windings, and multiple secondary windings independent from each other share one of the multiple low-voltage rectifying units.

In an embodiment, the multiple secondary windings independent from each other includes at least one of: secondary windings of different multi-winding transformers; and secondary windings on different magnetic columns in one multi-winding transformer.

In an embodiment, the multiple secondary windings independent from each other are connected in series to an input end of the shared low-voltage rectifying unit; or the multiple secondary windings independent from each other are connected in parallel to the input end of the shared low-voltage rectifying unit.

In an embodiment, output ends of low-voltage rectifying units are connected to each other through a bus, to ensure that at least one secondary winding in at least one multi-winding transformer is indirectly connected to a secondary winding in at least one of other multi-winding transformers.

In an embodiment, at least one secondary winding in each multi-winding transformer is indirectly connected to a secondary winding in each of other multi-winding transformers through the corresponding low-voltage rectifying unit and the bus.

In an embodiment, secondary windings connected to each other through the bus are connected to an external power supply through the bus.

In an embodiment, in each of multi-winding transformers that are connected to the low-voltage rectifying units connected to each other through the bus, a secondary winding in each module unit is indirectly connected to a secondary winding in each of other multi-winding transformers through the bus.

In an embodiment, the cascaded multi-port converter further includes at least one additional redundant module unit. Each secondary winding in the redundant module unit independently outputs through a corresponding low-voltage rectifying unit.

In an embodiment, the cascaded multi-port converter further includes multiple multi-port multiplexing units. Input ends of each of the multiple multi-port multiplexing units are respectively connected to output ends of different low-voltage rectifying units.

In an embodiment, at least one of the multiple multi-port multiplexing units includes: a multi-input coupling branch; or a multi-input coupling branch and a converter provided at a rear stage of the multi-input coupling branch.

In an embodiment, the multi-input coupling branch comprises at least one of: a multi-input series structure, a multi-input parallel structure and a multi-input series-parallel switching structure.

In an embodiment, in a case that the multi-port multiplexing unit includes the multi-input coupling branch and the converter provided at the rear stage of the multi-input coupling branch, and the multi-input coupling branch comprises the multi-input series-parallel switching structure, switches in the multi-input series-parallel switching structure are bidirectional switches.

In an embodiment, in a case that the converter is an unidirectional converter, a bidirectional switch in the multi-input series-parallel switching structure connected to a positive electrode or a negative electrode of an input end of the multi-input series-parallel switching structure is replaced by a diode.

In an embodiment, a high-voltage conversion unit includes a DC/AC converter and a first AC/DC converter. An AC side of the first AC/DC converter serves as an input end of the high-voltage conversion unit. A DC side of the first AC/DC converter is connected to a DC side of the DC/AC converter. An AC side of the DC/AC converter serves as an output end of the high-voltage conversion unit.

In an embodiment, the first AC/DC converter is a full bridge structure, or a half bridge structure.

In an embodiment, each of the multiple low-voltage rectifying units includes a second AC/DC converter. An AC side of the second AC/DC converter serves as an input end of said low-voltage rectifying unit. A DC side of the second AC/DC converter serves as an output end of said low-voltage rectifying unit.

In an embodiment, the DC/AC converter and the second AC/DC converter through a corresponding winding form one of: a double active bridge structure, an inductor-inductor-capacitor (LLC) structure, and a capacitor-inductor-inductor-capacitor (CLLC) structure.

A three-phase medium-voltage input system is provided according to a second aspect of the present disclosure. The three-phase medium-voltage input system includes three phase units, and each of the three phase units includes an inductor and the cascaded multi-port converter according to any one of the first aspect of the present disclosure. Head ends of input ends of the three phase units are connected to a medium-voltage power grid. Tail ends of the input ends of the three phase units are connected to each other. In each of the three phase units, a head end of an input end of the cascaded multi-port converter is connected to an end of the inductor, another end of the inductor serves as a head end of an input end of the phase unit, and a tail end of the input end of the cascaded multi-port converter serves as a tail end of the input end of the phase unit.

A three-phase medium-voltage input system is provided according to a third aspect of the present disclosure. The three-phase medium-voltage input system includes an modular multilevel converter (MMC) converter and N direct-current conversion units. Each of the direct-current conversion units includes an inductor and the cascaded multi-port converter according to any one of the first aspect of the present disclosure, and N represents a positive integer. Head ends of input ends of the direct-current conversion units are connected to a positive electrode of a DC side of the MMC converter. Tail ends of the input ends of the direct-current conversion units are connected to a negative electrode of the DC side of the MMC converter. An AC side of the MMC converter is connected to a medium-voltage power grid. In each of the direct-current conversion units, a head end of an input end of the cascaded multi-port converter is connected to an end of the inductor, another end of the inductor serves as a head end of an input end of the direct-current conversion unit, and a tail end of the input end of the cascaded multi-port converter serves as a tail end of the input end of the direct-current conversion unit. A first AC/DC converter of the cascaded multi-port converter in the direct-current conversion unit is replaced by two straight lines.

It can be seen from the above solutions, in the cascaded multi-port converter according to the present disclosure, input ends of the module units are cascaded, and two terminals of the cascaded module units serve as two ports of an input end of the cascaded multi-port converter. In each module unit: input ends of the high-voltage conversion units are cascaded, and two terminals of the cascaded high-voltage conversion units serve as two ports of an input end of said module unit; an output end of each high-voltage conversion unit is connected to a corresponding primary winding of each multi-winding transformer; the secondary winding of the multi-winding transformer serves as an output end of said module unit, and is connected to an input end of a corresponding low-voltage rectifying unit; and a magnetic core of the multi-winding transformer is wound with multiple primary windings and multiple secondary windings. Therefore, the windings of the multiple high-voltage conversion units share a magnetic core, which can reduce the number of the multi-winding transformers in the cascaded multi-port converter and correspondingly reduce the number of the low-voltage rectifying units, thereby reducing the volume, weight and cost of the cascaded multi-port converter.

BRIEF DESCRIPTION OF THE DRAWINGS

For clearer illustration of the technical solutions according to embodiments of the present disclosure or conventional technology, hereinafter are briefly described the drawings to be applied in embodiments of the present disclosure or conventional technology. Apparently, the drawings in the following descriptions are only some embodiments of the present disclosure, and other drawings may be obtained by those skilled in the art based on the provided drawings without creative efforts.

FIGS. 9a to 9c are schematic diagrams of a first AC/DC converter in a cascaded multi-port converter according to another embodiment of the present disclosure;

FIGS. 11a to 11f are schematic diagrams of a multi-port multiplexing unit in a cascaded multi-port converter according to an embodiment of the present disclosure;

DETAILED DESCRIPTION

In order to make the objectives, technical solutions and advantages of the embodiment of the present disclosure clearer, the technical solutions in embodiments of the present disclosure are described clearly and completely in conjunction with the drawings in embodiments of the present disclosure hereinafter. Apparently, the described embodiments are only some rather than all of the embodiments of the present disclosure. Any other embodiments obtained based on the embodiments of the present disclosure by those skilled in the art without any creative effort fall within the scope of protection of the present disclosure.

In the present disclosure, the terms such as "include", "comprise" or any other variants thereof means to be non-exclusive. Therefore, a process, a method, an article or a device including a series of elements include not only the disclosed elements but also other elements that are not clearly enumerated, or further include inherent elements of the process, the method, the article or the device. Unless expressively limited, the statement "including a . . . " does not exclude the case that other similar elements may exist in the process, the method, the article or the device other than enumerated elements.

A cascaded multi-port converter is provided according to an embodiment of the present disclosure, to solve the problem of the increase of volume, weight and cost of a converter due to the large number of cascaded modules according to the conventional technology.

Figure 1:
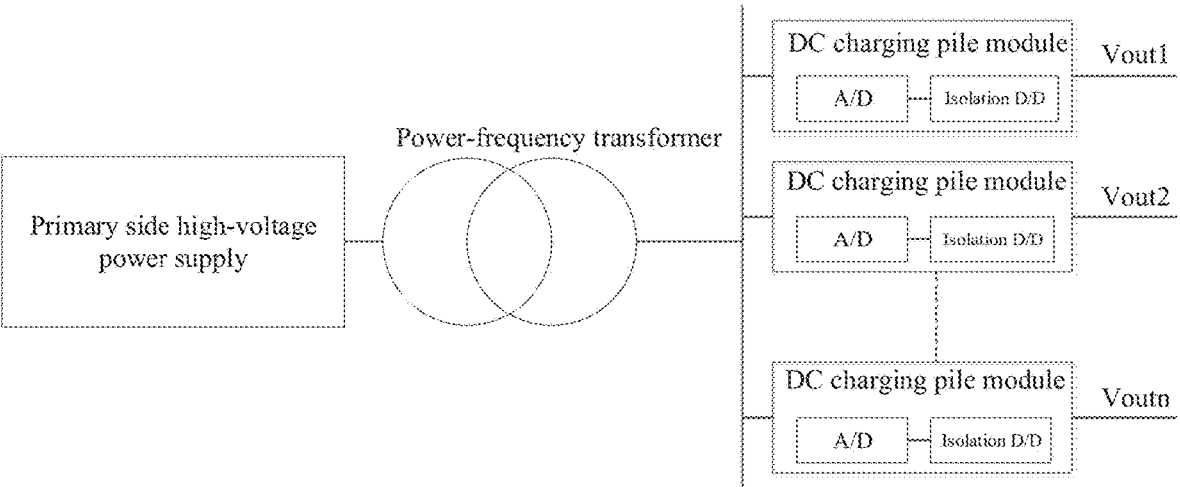
FIG. 1 is a schematic diagram of a power module according to the conventional technology.
Figure 2:
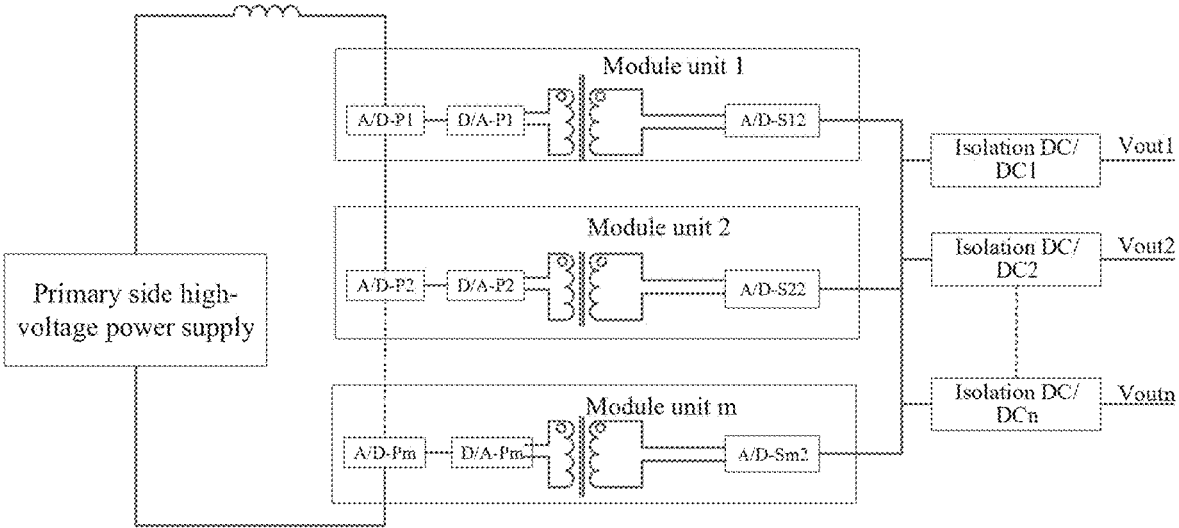
FIG. 2 is another schematic diagram of a power module according to the conventional technology.
Figure 3:
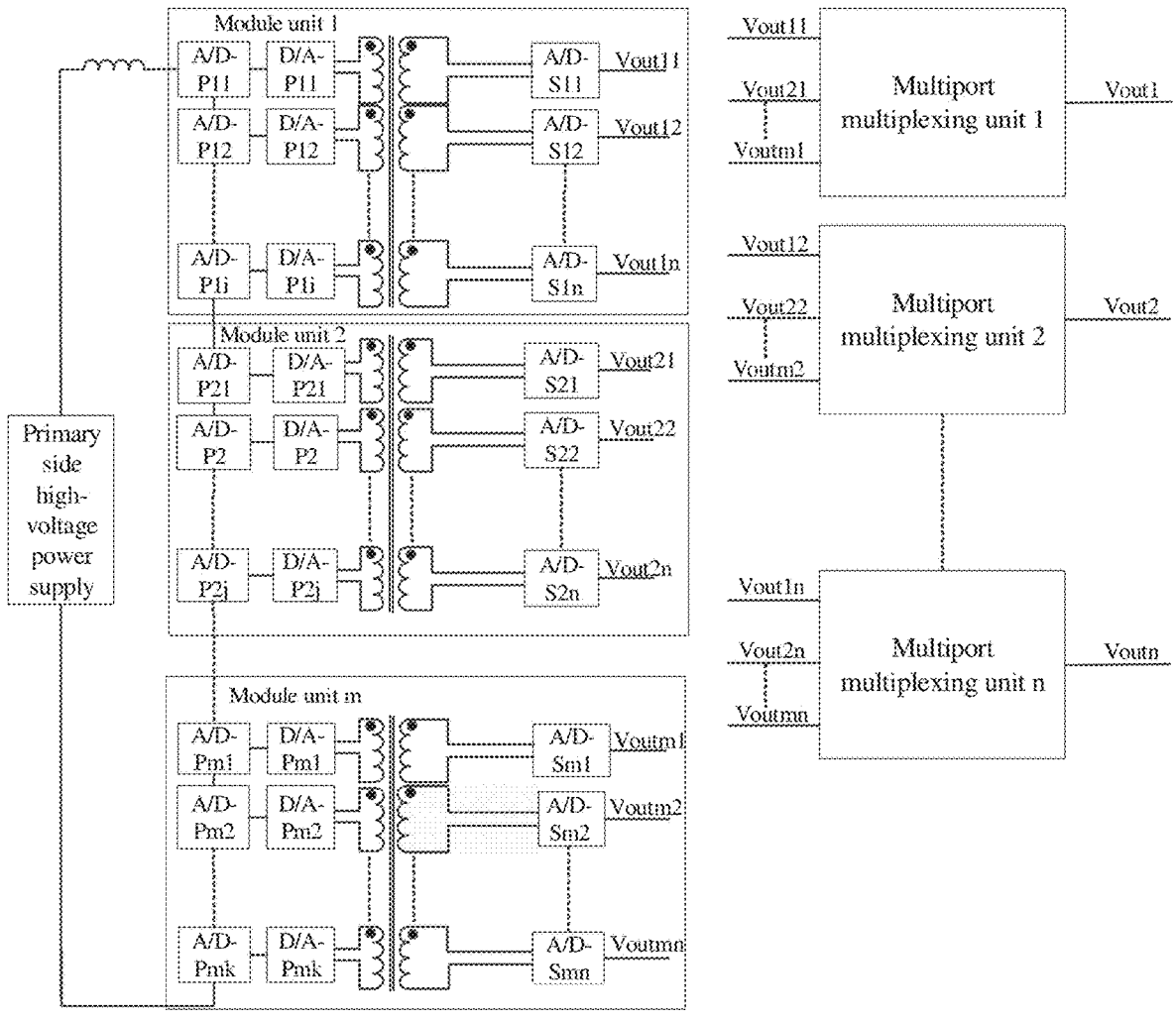
FIG. 3 is a schematic diagram of a cascaded multi-port converter according to an embodiment of the present disclosure.

As shown in FIG. 3, the cascaded multi-port converter includes multiple module units (that is, a module unit 1 to a module unit m shown in FIG. 3) and multiple low-voltage rectifying units (that is, A/D-S11 to A/D-Sin, A/D-S21 to A/D-S2n, and A/D-Sm1 to A/D-Smn shown in FIG. 3). Each module unit includes at least one multi-winding transformer and multiple high-voltage conversion units (for example, a first high-voltage conversion unit in the module unit 1 includes A/D-P11 and D/A-P11 as shown in FIG. 3).

Input ends of the multiple module units are cascaded, and two terminals of the cascaded module units serve as two ports of an input end of the cascaded multi-port converter. As shown in FIG. 3, a head end of an input end of the module unit 1 serves as a head end of the input end of the cascaded multi-port converter, and is connected to one end of a primary side high-voltage power supply. A tail end of the input end of the module unit 1 is connected to a head end of an input end of the module unit 2. A tail end of the input end of the module unit 2 is connected to a head end of an input end of a module unit 3. Likewise, a tail end of an input end of a module unit m−1 is connected to a head end of an input end of a module unit m, and a tail end of the input end of the module unit m is connected to another end of the primary side high-voltage power supply as a tail end of the input end of the cascaded multi-port converter.

It should be noted that the number m of the module units is not limited herein, and the number m may be determined according to the actual situation. All the implementations fall within the scope of protection of the present disclosure.

In each module unit: input ends of the multiple high-voltage conversion units are cascaded, and two terminals of the cascaded high-voltage conversion units serve as two ports of an input end of said module unit; a magnetic core of a multi-winding transformer is wound with multiple primary windings and at least one secondary winding; an output end of each of the multiple high-voltage conversion units is connected to a corresponding primary winding; and the secondary winding is connected to an input end of a corresponding low-voltage rectifying unit.

That is, a primary side of one multi-winding transformer may be connected to multiple high-voltage conversion units. A secondary side of one multi-winding transformer may be connected to one low-voltage rectifying unit. Alternatively, a secondary side of one multi-winding transformer may be connected to multiple low-voltage rectifying units (as shown in FIG. 3). Therefore, the voltage at both ends of the high-voltage conversion unit in the cascaded multi-port converter is controlled to be less than a corresponding threshold.

As shown in FIG. 3, an embodiment is described by an example with the module unit 1. The module unit 1 includes i high-voltage conversion units, and a b-th high-voltage conversion unit includes A/D-P1b and D/A-P1b, where $0 < b \le i$.

A head end of an input end of a first high-voltage conversion unit serves as the head end of the input end of the module unit 1. A tail end of the input end of the first high-voltage conversion unit is connected to a head end of an input end of a second high-voltage conversion unit. A tail end of the input end of the second high-voltage conversion unit is connected to a head end of an input end of a third high-voltage conversion unit. Likewise, a tail end of an input end of an i−1-th high-voltage conversion unit is connected to a head end of an input end of an i-th high-voltage conversion unit, and a tail end of the input end of the i-th high voltage conversion unit serves as the tail end of the input end of the module unit 1.

In the embodiment, as shown in FIG. 3, the number of the high-voltage conversion units is i+j+ . . . +k. According to the conventional technology, the number of the cascaded units at the high-voltage side is s, and the cascaded units at the high-voltage side are configured for voltage division. Therefore, the number of the A/D units at the low-voltage side in the conventional technology is much greater than the number of the low-voltage rectifying units in the embodiment of the present disclosure, and more transformers are required in the conventional technology. Therefore, in the embodiment, a magnetic core of a multi-winding transformer is wound with multiple primary windings and multiple secondary windings, and primary windings corresponding to multiple high-voltage conversion units share the magnetic core. Each low-voltage rectifying unit is coupled with one high-voltage conversion unit by magnetic coupling, and the multiple high-voltage conversion units can perform power exchange with the multiple low-voltage rectifying units. In the cascaded multi-port converter, the number of the multi-winding transformers and the number of the low-voltage rectifying units can be reduced, thereby reducing the volume, weight and cost of the cascaded multi-port converter.

In the above embodiments, the number of the low-voltage rectifying units is the same as the number of all secondary windings, or the number of the low-voltage rectifying units is different from the number of the secondary windings. Here, two cases are described in which the number of the low-voltage rectifying units is the same as the number of all secondary windings, and the number of the low-voltage rectifying units is less than the number of all secondary windings.

In a first case, the number of the low-voltage rectifying units is the same as the number of all secondary windings, and the secondary windings are connected to input ends of the low-voltage rectifying unit in one-to-one correspondence.

That is, an input end of each of the low-voltage rectifying units is only connected to one secondary winding, that is, the secondary windings and the low-voltage rectifying units are in a one-to-one correspondence.

As shown in FIG. 3, the following is described by taking the module unit 1 as an example. An input end of the low-voltage rectifying unit A/D-S11 is connected to a first secondary winding in the module unit 1, and an input end of the low-voltage rectifying unit A/D-S12 is connected to a second secondary winding in the module unit 1, likewise, an input end of the low-voltage rectifying unit A/D-Sin is connected to an n-th secondary winding in the module unit 1. It should be noted that for each low-voltage rectifying unit, the AC side of the low-voltage rectifying unit serves as the input end of the low-voltage rectifying unit, and the DC side of the low-voltage rectifying unit serves as the output end of the low-voltage rectifying unit (that is, Vout11 to Vout1$n$, Vout21 to Vout2$n$, . . . , and Voutm1 to Voutmn shown in FIG. 3).

It should be noted that if one magnetic column is wound with too many primary windings, a voltage difference between multiple primary windings will be too large, resulting in the increase of the difficulty of insulation design. If one magnetic column is wound with too few primary windings, the number of the low-voltage rectifying units will be too large. In view of this, a solution that multiple secondary windings from each other share one low-voltage rectifying unit in a series-parallel way is provided, to solve the problems of the too large voltage difference between multiple primary windings and too large number of the low-voltage rectifying units. For details of the solution, reference is made to the following description.

In a second case, the number of the low-voltage rectifying units is less than the number of all secondary windings, and multiple independent share one of the low-voltage rectifying units.

It should be noted that it is determined whether two secondary windings are independent from each other by determining whether the two secondary windings affect each other. If two secondary windings affect each other, the two secondary windings are not independent from each other, and if the two secondary windings do not affect each other, the two secondary windings are independent from each other. Normally, secondary windings on one magnetic column affect each other. That is, secondary windings in different transformers do not effect each other and are independent from each other, and secondary windings on different magnetic columns in one transformer do not effect each other and are independent from each other.

Figure 4:
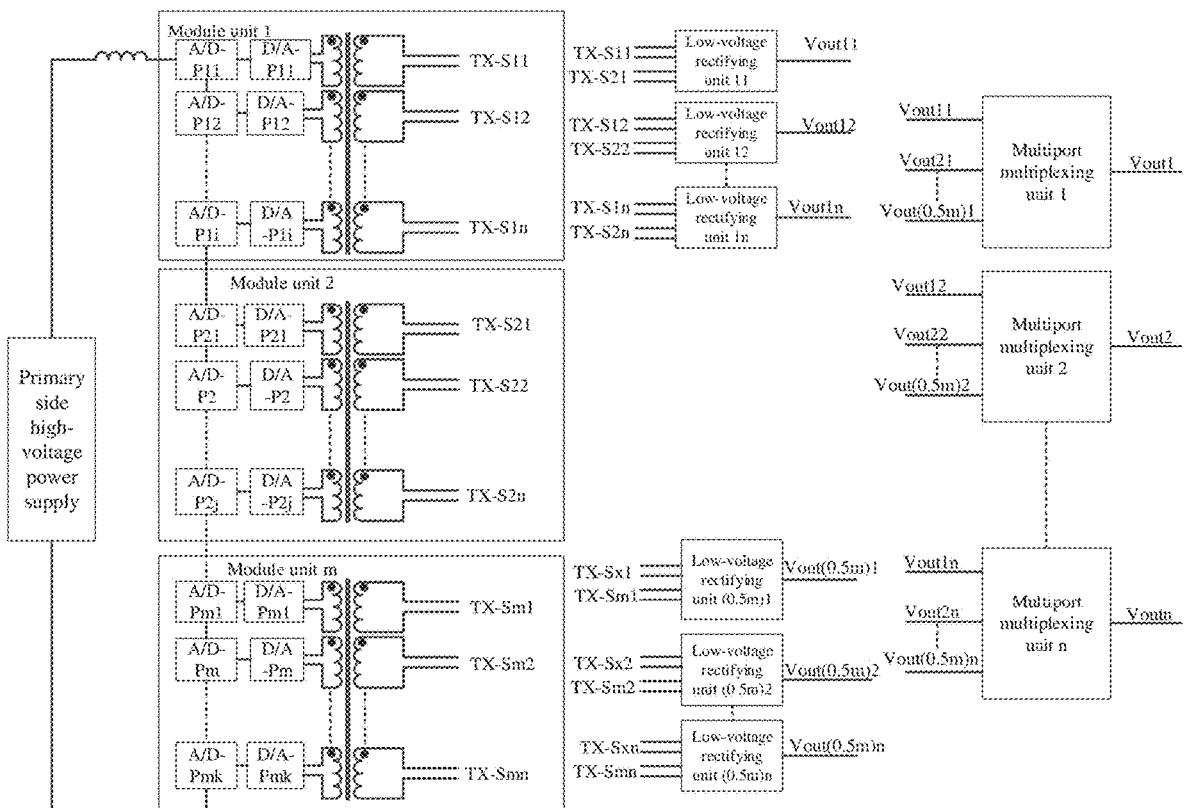
FIG. 4 is a schematic diagram of a cascaded multi-port converter according to another embodiment of the present disclosure.

Case I: in practices, as shown in FIG. 4, each module unit includes one multi-winding transformer, and the multi-winding transformer includes only one magnetic column. The secondary windings of different multi-winding transformers are independent from each other. For example, one secondary winding in the module unit 1 is independent from secondary windings in the module unit 2 and secondary windings in the module unit 3. Secondary windings in one module unit are not independent from each other. For example, the secondary windings in the module unit 1 are not independent from each other. That is, the multiple secondary windings independent from each other include the secondary windings of different multi-winding transformers. Therefore, the multiple secondary windings independent from each other may share one low-voltage rectifying unit.

The secondary winding TX-S11 in the module unit 1 and the secondary winding TX-S21 in the module unit 2 share the low-voltage rectifying unit 11, and the secondary winding TX-S12 in the module unit 1 and the secondary winding TX-S22 in the module unit 2 share the low-voltage rectifying unit 12. Likewise, the secondary winding TX-Sin in the module unit 1 and the secondary winding TX-S2$n$ in the module unit 2 share the low-voltage rectifying unit in. Likewise, the secondary winding TX-Sx1 in the module unit x and the secondary winding TX-Sm1 in the module unit m share the low-voltage rectifying unit (0.5 m)1, and the secondary winding TX-Sx2 in the module unit x and the secondary winding TX-Sm2 in the module unit m share the low-voltage rectifying unit (0.5 m)2. Likewise, the secondary winding TX-Sxn in the module unit x and the secondary winding TX-Smn in the module unit 2 share the low-voltage rectifying unit (0.5 m)n.

It should be noted that FIG. 4 shows an example in which two secondary windings independent from each other share one low-voltage rectifying unit. Therefore, the number of the low-voltage rectifying units is 0.5 m. The number of the low-voltage rectifying units is related to the number of the independent secondary windings sharing low-voltage rectifying units. The number of the secondary windings sharing low-voltage rectifying units may be 2a, and a represents a positive integer, for example, 2a represents 2, 4, 6, 8, and the like. The value of a is not limited herein, which may be determined according to the actual situation. All the implementations fall within the scope of protection of the present disclosure. In addition, the number of the secondary windings sharing low-voltage rectifying units may be other values, which is not repeated herein. All the implementations fall within the scope of protection of the present disclosure.

In practices, if a system only includes one cascaded multi-port converter, secondary windings of different multi-winding transformers in the cascaded multi-port converter are independent from each other. If a system includes at least two cascaded multi-port converters, and the cascaded multi-port converters are connected to the system in one manner, secondary windings of different cascaded multi-port converters are independent from each other. The specific structures are not described herein, which may be determined according to the actual situation. All the implementations fall within the scope of protection of the present disclosure.

It should be noted that in one multi-winding transformer, coupling between windings is good. In a case of high-voltage insulation requirements, in one multi-winding transformer, coupling between windings of different magnetic columns is greatly reduced. In order to avoid power imbalance caused by greatly reduction of the coupling, in one multi-winding transformer, secondary windings of different magnetic columns serve as secondary windings independent from each other, that is, the following case II.

Figure 5:
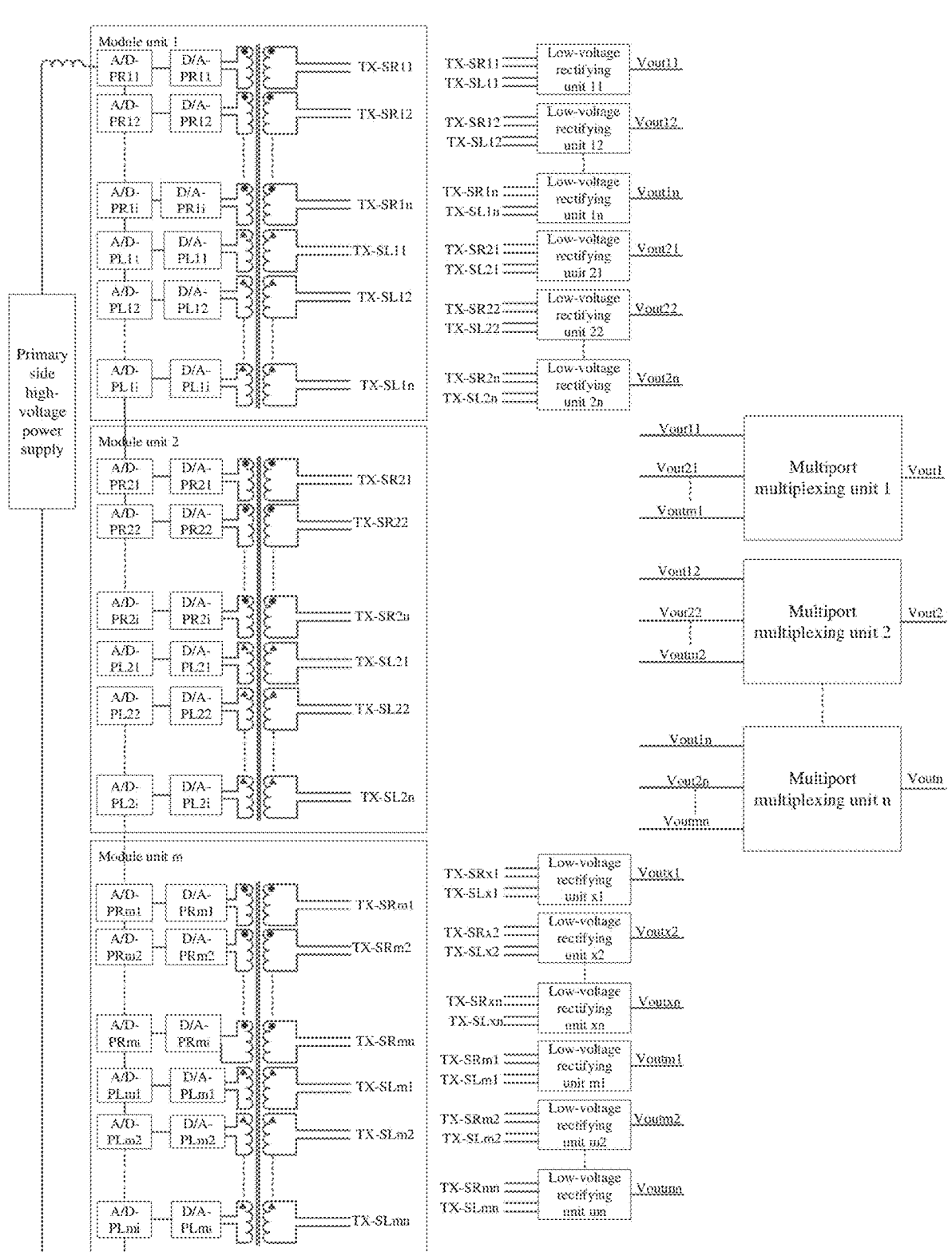
FIG. 5 is a schematic diagram of a cascaded multi-port converter according to another embodiment of the present disclosure.

Case II: in practices, as shown in FIG. 5, each module unit includes one multi-winding transformer, and the multi-winding transformer includes at least two magnetic columns. In one multi-winding transformer, the secondary windings of different magnetic columns are independent from each other. For example, secondary windings TX-SR11 to TX-SR IN on one magnetic column in the module unit 1 affect each other and are not independent from each other. One of the secondary windings TX-SR11 to TX-SR IN is independent from the secondary windings TX-SL11 to TX-SL1$n$ on the other magnetic column in the module unit 1, and is independent from secondary windings in the module unit 2 and secondary windings the module unit 3. The secondary windings on other magnetic columns are similar to the above, which are not repeated herein.

The secondary winding TX-SR11 in the module unit 1 and the secondary winding TX-SL11 in the module unit 1 share the low-voltage rectifying unit 11, the secondary winding TX-SR12 in the module unit 1 and the secondary winding TX-SL12 in the module unit 1 share the low-voltage rectifying unit 12, likewise, the secondary winding TX-SR1$n$ in the module unit 1 and the secondary winding TX-SL1$n$ in the module unit 1 share the low-voltage rectifying unit in. The secondary winding TX-SR21 in the module unit 2 and the secondary winding TX-SL21 in the module unit 2 share the low-voltage rectifying unit 21, the secondary winding TX-SR22 in the module unit 2 and the secondary winding TX-SL22 in the module unit 2 share the low-voltage rectifying unit 22, likewise, the secondary winding TX-SR2$n$ in the module unit 2 and the secondary winding TX-SL2$n$ in the module unit 2 share the low-voltage rectifying unit 2$n$. Likewise, the secondary winding TX-SRx1 in the module unit x and the secondary winding TX-SLx1 in the module unit x share the low-voltage rectifying unit x1, the secondary winding TX-SRx2 in the module unit x and the secondary winding TX-SLx2 in the module unit x share the low-voltage rectifying unit x2, likewise, the secondary winding TX-SRxn in the module unit x and the secondary winding TX-SLxn in the module unit x share the low-voltage rectifying unit xn. The secondary winding TX-SRm1 in the module unit m and the secondary winding TX-SLm1 in the module unit m share the low-voltage rectifying unit m1, the secondary winding TX-SRm2 in the module unit m and the secondary winding TX-SLm2 in the module unit m share the low-voltage rectifying unit m2, likewise, the secondary winding TX-SRmn in the module unit m and the secondary winding TX-SLmn in the module unit m share the low-voltage rectifying unit mn.

It should be noted that FIG. 5 shows an example in which two secondary windings independent from each other share one low-voltage rectifying unit. The number of the secondary windings sharing low-voltage rectifying units may be 2a, and a represents a positive integer, for example, 2a represents 2, 4, 6, 8, and the like. The value of a is not limited herein, which may be determined according to the actual situation. All the implementations fall within the scope of protection of the present disclosure. In addition, the number of the secondary windings sharing low-voltage rectifying units may be other values, which is not repeated herein. All the implementations fall within the scope of protection of the present disclosure.

Figure 6:
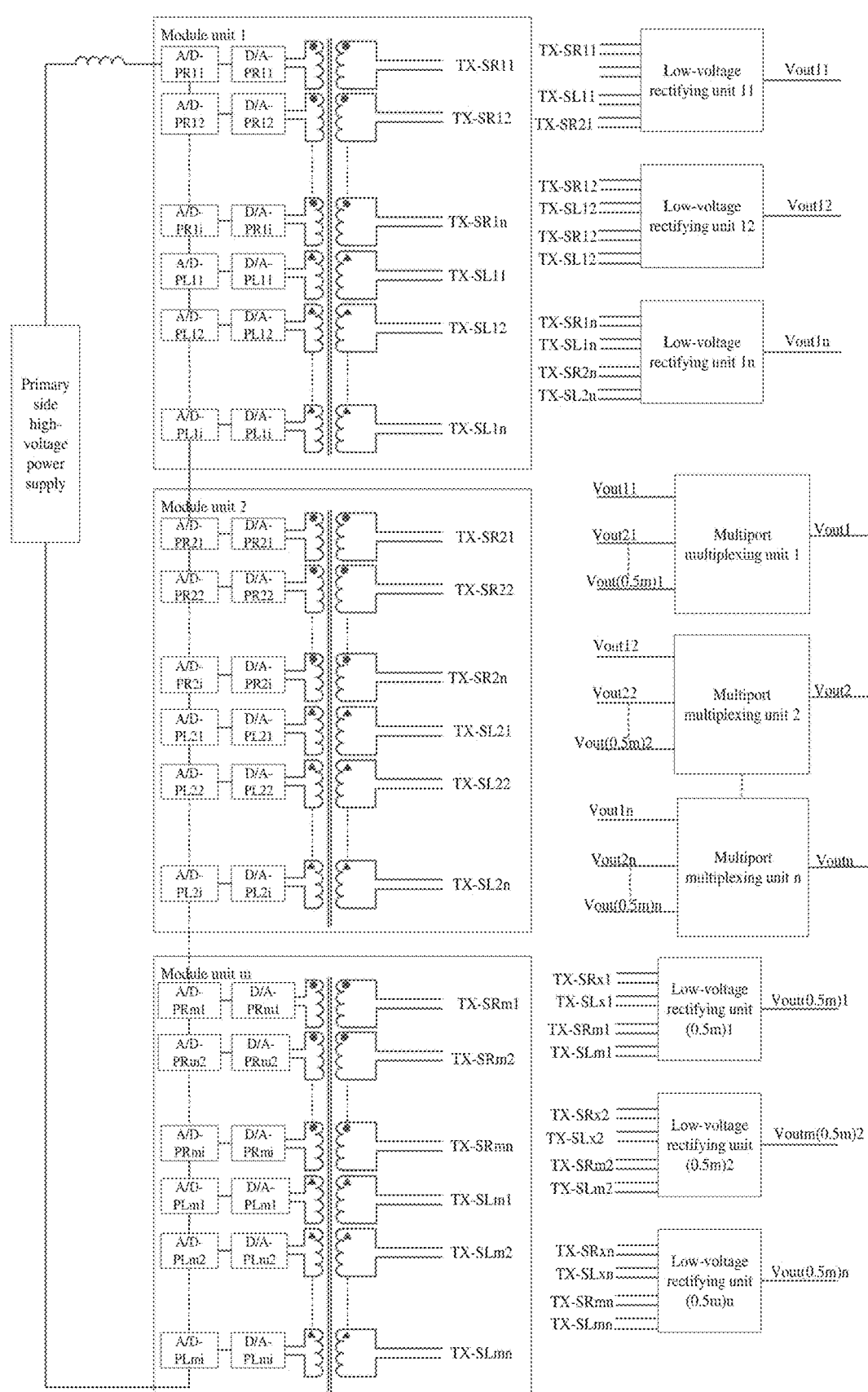
FIG. 6 is a schematic diagram of a cascaded multi-port converter according to another embodiment of the present disclosure.

Case III: in practices, combine with FIGS. 4 and 5, as shown in FIG. 6, each module unit has a multi-winding transformer, and each multi-winding transformer includes at least two magnetic columns. The cascaded multi-port converter includes at least two multi-winding transformers each including at least two magnetic columns. In one multi-winding transformer, the secondary windings on different magnetic columns are independent from each other. In different multi-winding transformers, secondary windings are independent from each other. For example, in the module unit 1, the secondary windings TX-SR11 to TX-SR1$n$ affect each other and are not independent from each other. One of the secondary windings TX-SR11 to TX-SR1$n$ is independent from the secondary windings TX-SL11 to TX-SL1$n$ in the module unit 1, and is independent from the secondary windings in the module unit 2 and secondary windings the module unit 3. The secondary windings on other magnetic columns are similar to the above, which are not repeated herein.

The secondary windings TX-SR11 and TX-SL11 in the module unit 1 and the secondary windings TX-SR21 and TX-SL21 in the module unit 2 share the low-voltage rectifying unit 11. The secondary windings TX-SR12 and TX-SL12 in the module unit 1 and the secondary windings TX-SR22 and TX-SL22 in the module unit 2 share the low-voltage rectifying unit 12. Likewise, the secondary windings TX-SR1$n$ and TX-SL1$n$ in the module unit 1 and the secondary windings TX-SR2$n$ and TX-SL2$n$ in the module unit 2 share the low-voltage rectifying unit in. Likewise, the secondary windings TX-SRx1 and TX-SLx1 in the module unit x and the secondary windings TX-SRm1 and TX-SLm1 in the module unit m share the low-voltage rectifying unit (0.5 m)1. The secondary windings TX-SRx2 and TX-SLx2 in the module unit x and the secondary windings TX-SRm2 and TX-SLm2 in the module unit m share the low-voltage rectifying unit (0.5 m)2. Likewise, the secondary windings TX-SRxn and TX-SLxn in the module unit x and the secondary windings TX-SRmn and TX-SLmn in the module unit m share the low-voltage rectifying unit (0.5 m)n.

It should be noted that FIG. 6 shows an example in which four secondary windings independent from each other share one low-voltage rectifying unit. The number of the secondary windings sharing low-voltage rectifying units may be 4a, and a represents a positive integer, for example, 4a represents 4, 8, and the like. The value of a is not limited herein, which may be determined according to the actual situation. All the implementations fall within the scope of protection of the present disclosure. In addition, the number of the secondary windings sharing low-voltage rectifying units may be other values, which is not repeated herein. All the implementations fall within the scope of protection of the present disclosure.

For each multi-winding transformer, each secondary winding of the multi-winding transformer is connected to a low-voltage rectifying unit corresponding to the secondary winding, to ensure the coupling consistency of the high-voltage conversion unit.

As described in the above case I, case II and case III, in a case that multiple secondary windings independent from each other share one low-voltage rectifying unit, the secondary windings have the following two connection manner.

Figure 7A:
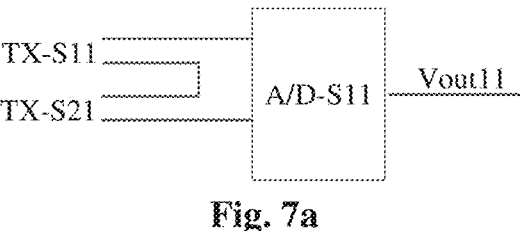
FIGS. 7a and 7b are schematic diagrams showing two secondary windings independent from each other connected to a low-voltage rectifying unit.

The multiple secondary windings independent from each other may be connected in series to form a branch, and the branch is connected to an input end of the shared low-voltage rectifying unit (as shown in FIG. 7a, FIG. 7a shows that two secondary windings independent from each other share one low-voltage rectifying unit and is illustrated based on FIG. 4). Specifically, as shown in FIG. 7a, an end of the secondary winding TX-S11 is connected to a head end of the input end of the low-voltage rectifying unit A/D-S11, the other end of the secondary winding TX-S11 is connected to an end of the secondary winding TX-S21, and the other end of the secondary winding TX-S21 is connected to a tail end of the input end of the low-voltage rectifying unit A/D-S11.

Figure 7B:
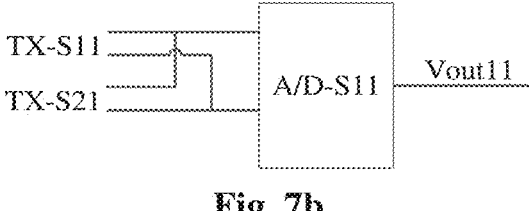

Alternatively, the multiple secondary windings independent from each other may be connected in parallel to form a branch, and the branch is connected to the input end of the shared low-voltage rectifying unit (as shown in FIG. 7b, FIG. 7b shows that two secondary windings independent from each other share one low-voltage rectifying unit and is illustrated based on FIG. 4). Specifically, as shown in FIG. 7b, an end of the secondary winding TX-S11 is connected to an end of the secondary winding TX-S21 to form a connection point, and the connection point is connected to the head end of the input end of the low-voltage rectifying unit A/D-S11. The other end of the secondary winding TX-S11 is connected to the other end of the secondary winding TX-S21 to form a connection point, and the connection point is connected to the tail end of the input end of the low-voltage rectifying unit A/D-S11.

In the embodiment, multiple secondary windings independent from each other share one low-voltage rectifying unit, to reduce the number of the low-voltage rectifying units, thereby reducing the complexity and cost of the cascaded multi-port converter, so that the cascaded multi-port converter has a high power density, low cost and high efficiency.

In any one of the above embodiments, the high voltage conversion unit includes a DC/AC converter (such as a D/A in FIGS. 3 to 6) and a first AC/DC converter (such as an A/D in FIGS. 3 to 6).

An AC side of the first AC/DC converter serves as an input end of the high voltage conversion unit. A DC side of the first AC/DC converter is connected to a DC side of the DC/AC converter. An AC side of the DC/AC converter serves as an output end of the high voltage conversion unit.

In practices, the first AC/DC converter is a full bridge structure, as shown in FIG. 9a. Alternatively, the first AC/DC converter is a half bridge structure, as shown in FIG. 9b. The structure of the first AC/DC converter is not limited herein, and may be determined according to the actual situation. All the implementations fall within the scope of protection of the present disclosure. In a case that DC current is inputted to a high voltage side of the cascaded multi-port converter, the first AC/DC converter may be removed and the DC/AC converters may be directly connected in series, and the cascaded first AC/DC converter may be replaced by two lines as shown in FIG. 9c.

The low-voltage rectifying unit includes a second AC/DC converter. An AC side of the second AC/DC converter serves as an input end of the low-voltage rectifying unit, and a DC side of the second AC/DC converter serves as an output end of the low-voltage rectifying unit.

Figure 10A:
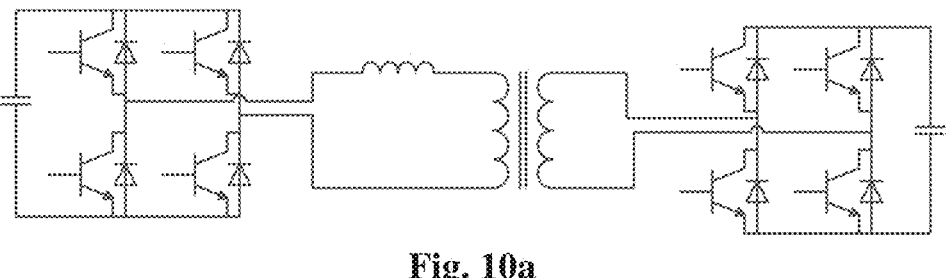
FIGS. 10a to 10c are schematic structural diagrams of a second AC/DC converter and a DC/AC converter in a cascaded multi-port converter according to an embodiment of the present disclosure.
Figure 10B:
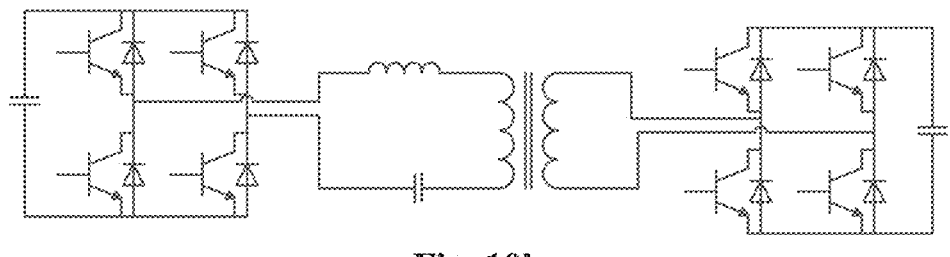
Figure 10C:
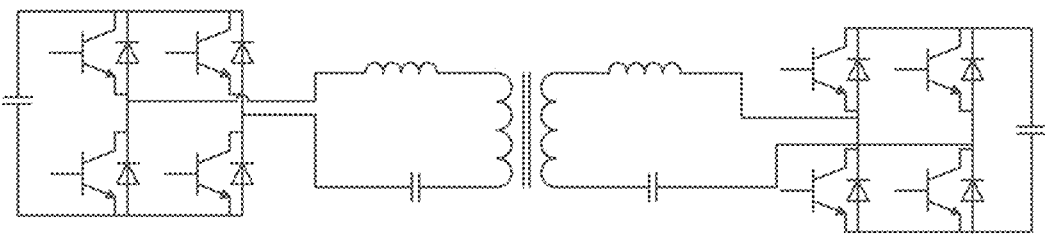

It should be noted that the DC/AC converter and the second AC/DC converter through the corresponding windings may form one of the following structures: a double active bridge structure as shown in FIG. 10a, an inductor-inductor-capacitor (LLC) structure as shown in FIG. 10b, and a capacitor-inductor-inductor-capacitor (CLLC) structure as shown in FIG. 10c. In addition, other structures may further be formed, which are not described herein. The structure formed by the DC/AC converter and the second AC/DC converter through the corresponding windings is not limited herein, which may be determined according to the actual situation. All the implementations fall within the scope of protection of the present disclosure.

In an embodiment, in any one of the above embodiments, the cascaded multi-port converter further includes multiple multi-port multiplexing units (such as a multi-port multiplexing unit 1, a multi-port multiplexing unit 2, . . . and a multi-port multiplexing unit n shown in FIGS. 3 to 6).

Input ends of each of the multi-port multiplexing units are respectively connected to output ends of different low-voltage rectifying units. For example, as shown in FIG. 3, a first input end of the multi-port multiplexing unit 1 is connected to the output end Vout11 of the low-voltage rectifying unit A/D-S11, a second input end of the multi-port multiplexing unit 1 is connected to the output end Vout21 of the low-voltage rectifying unit A/D-S21, likewise, an m-th input end of the multi-port multiplexing unit 1 is connected to the output end Voutm1 of the low-voltage rectifying unit A/D-Sm1. The multi-port multiplexing unit 2 to the multi-port multiplexing unit n are similar to the above, which are not repeated herein. All the implementations fall within the scope of protection of the present disclosure.

It should be noted that in secondary windings of each multi-winding transformer, at least one secondary winding is connected to the bus through a multi-port multiplexing unit corresponding to the secondary winding. In practices, in each multi-winding transformer, each secondary winding of the multi-winding transformer may be connected to a secondary winding in other multi-winding transformers through a low-voltage rectifying unit corresponding to the secondary winding. FIGS. 3 to 6 show an example in which in each multi-winding transformer, each secondary winding of the multi-winding transformer is connected to the bus. A structure in which in each multi-winding transformer, only some of the secondary windings of the multi-winding transformer are connected to the bus is similar to structures shown in FIGS. 3 to 6, which is not repeated herein. All the implementations fall within the scope of protection of the present disclosure.

In practices, the multi-port multiplexing unit includes a multi-input coupling branch. Alternatively, the multi-port multiplexing unit includes a multi-input coupling branch and a converter provided at a rear stage of the multi-input coupling branch.

The multi-input coupling branch has at least one of following structures: a multi-input series structure, a multi-input parallel structure and a multi-input series-parallel switching structure.

Figure 11A:
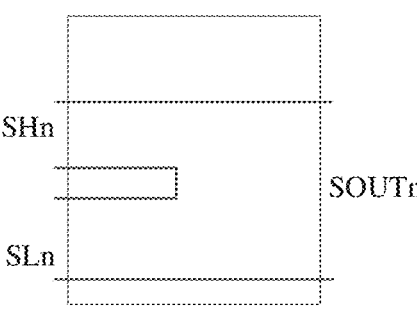
Figure 11B:
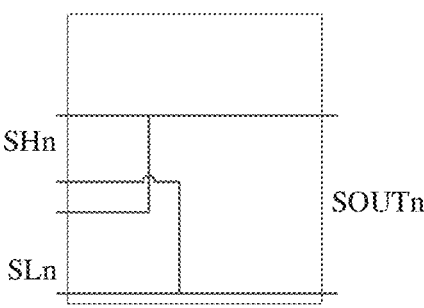
Figure 11C:
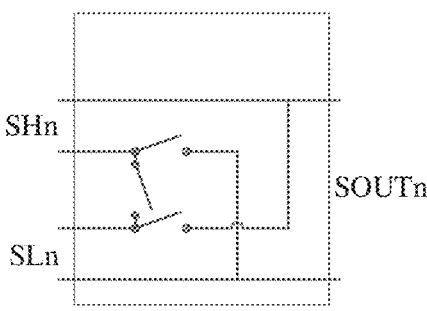

It should be noted that the multi-input series structure is shown in FIG. 11a. FIG. 11a shows an example with two inputs, other numbers of the inputs are the same, which are not repeated herein. All the implementations fall within the scope of protection of the present disclosure. The multi-input parallel structure is shown in FIG. 11b. FIG. 11b shows an example with two inputs, other numbers of the inputs are the same, which are not repeated herein. All the implementations fall within the scope of protection of the present disclosure. The multi-input series-parallel switching structure is shown in FIG. 11c, in which a switch is arranged between an input end and an output end, and a switch is arranged between two input ends. A positive electrode of an input end SHn is connected to a positive electrode of an output end SOUTn, a negative electrode of the input end SHn is connected to a negative electrode of an output end SOUTn through a first switch, the negative electrode of the input end SHn is further connected to a positive electrode of an input end SLn through a second switch, the positive electrode of the input end SLn is further connected to the positive electrode of the output end SOUTn through a third switch, and a negative electrode of the input end SLn is connected to the negative electrode of the output end SOUTn. FIG. 11c shows an example with two inputs, other numbers of the inputs are the same, which are not repeated herein. All the implementations fall within the scope of protection of the present disclosure. In a case that the multi-input coupling branch adopts the structure shown in FIG. 11c, the series-parallel connection of the input units can be switched, thereby reducing the requirements of the gain range of the converter.

In practices, in a case that the multi-port multiplexing unit includes the multi-input coupling branch and the converter provided at the rear stage of the multi-input coupling branch, and the multi-input coupling branch is the multi-input series-parallel switching structure, if the converter is a bidirectional converter, switches in the multi-input series-parallel switching structure are all bidirectional switches, that is, current flows through the switches in both directions; and if the converter is an unidirectional converter, the switches in the multi-input series-parallel switching structure may be all bidirectional switches, or a part of the bidirectional switches may be replaced by diodes, such as switches connected to positive electrodes of the input ends, or switches connected to negative electrodes of the input ends.

The converter provided at the rear stage of the multi-input coupling branch includes an inductor and a capacitor. Both ends of the capacitor are connected to the positive electrode and negative electrode of the output end of the multi-port multiplexing unit.

As shown in FIG. 11d, the positive electrode of the input end SHn is connected to the negative electrode of the input end SHn through the first switch and the second switch. An end of the inductor is connected to a connection point of the first switch and the second switch. Another end of the inductor is connected to an end of the capacitor and the positive electrode of the output end SOUTn. The negative electrode of the input end SHn is connected to a connection point of the third switch and the fourth switch. The positive electrode of the input end SLn is connected to the negative electrode of the input end SLn through the third switch and the fourth switch. The negative electrode of the input end SLn is further connected to another end of the capacitor and the negative electrode of the output end SOUTn. As a transformer, since the converter of the multi-input coupling branch may adjust a gain, the multi-port multiplexing unit in the structure shown in FIG. 10d can further reduce the requirements of the gain range of the converter and continuously adjust a voltage.

In a case that the multi-port multiplexing unit is unidirectional, the multi-port multiplexing unit may be a structure shown in FIG. 11e, and the first switch and the fourth switch are replaced by diodes. The connection between the first switch and the fourth switch is not described redundantly herein. All the implementations fall within the scope of protection of the present disclosure. Alternatively, the multi-port multiplexing unit may be a structure shown in FIG. 11f, and the second switch and the third switch are replaced by diodes. The connection between the second switch and the third switch is not described redundantly herein. All the implementations fall within the scope of protection of the present disclosure. The two switches are implemented by two diodes, thereby reducing the cost.

Figure 12A:
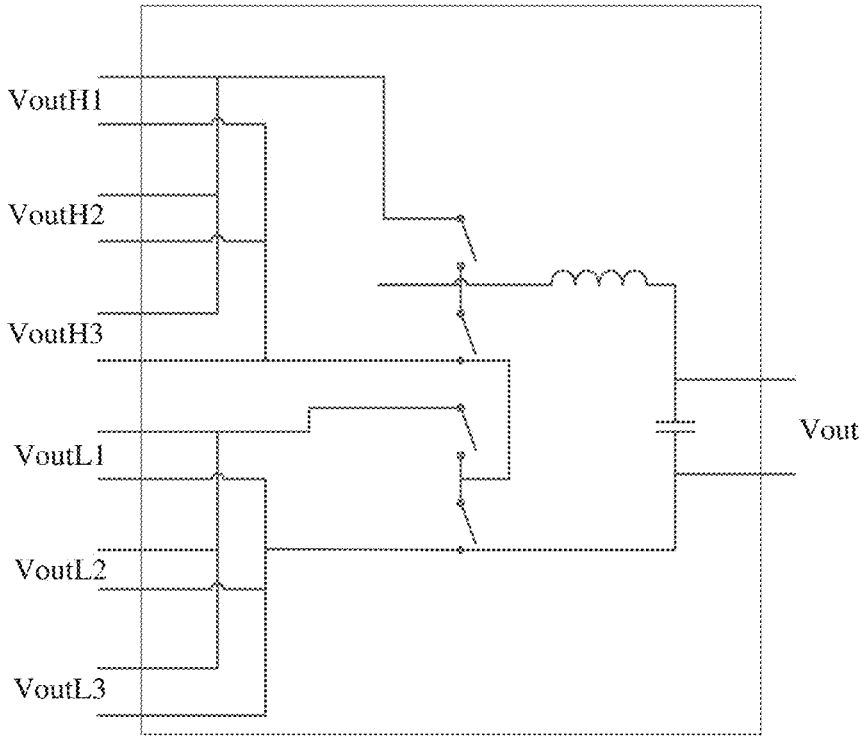
FIGS. 12a to 12c are schematic diagrams of a multi-port multiplexing unit in a cascaded multi-port converter according to another embodiment of the present disclosure.
Figure 12B:
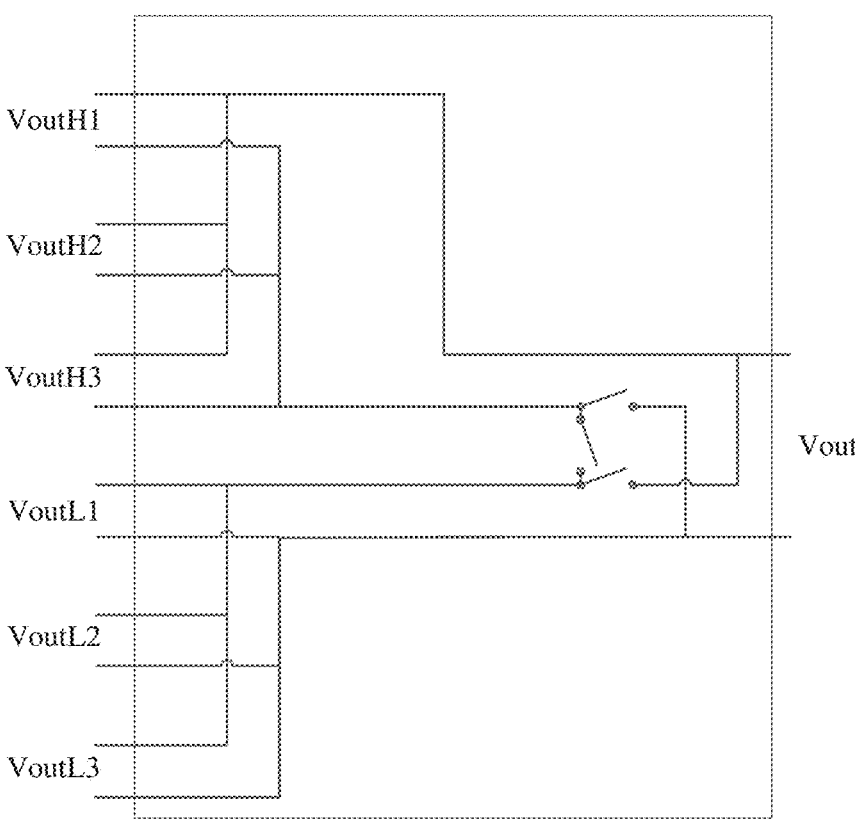
Figure 12C:
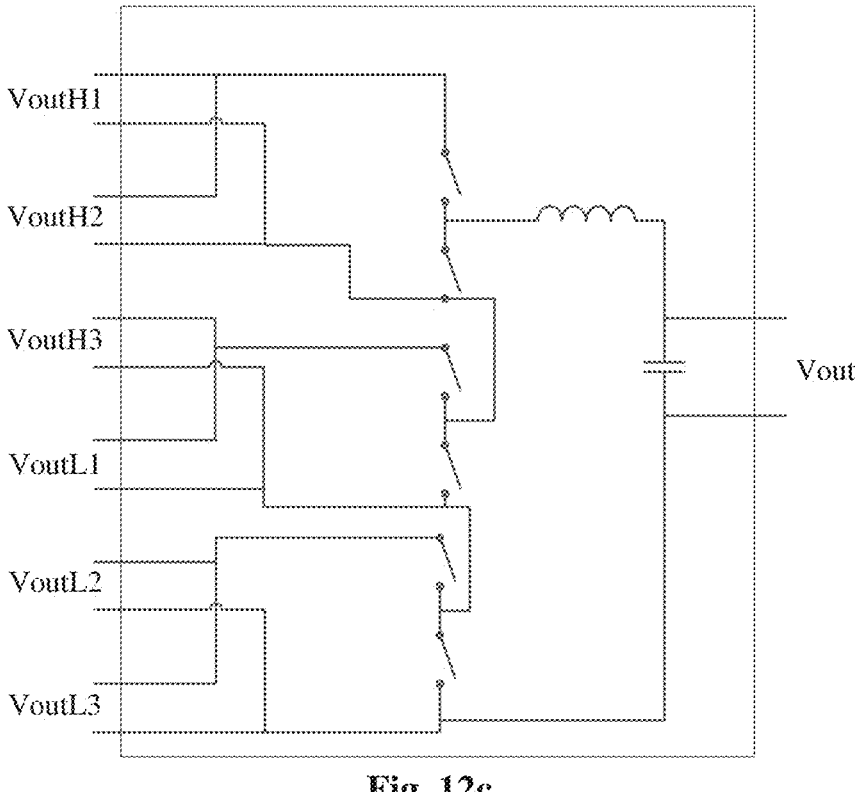

It should be noted that in a case of multi-input and one-output, solutions shown in FIGS. 11a to 11f may be combined to obtain more flexible and diverse solutions. Reference is made to FIGS. 12a to 12c, which are some structures of six-input and one-output. As shown in FIG. 12a, three modules are connected in parallel to each other by using the structure shown in FIG. 11b, and then two branches are cascaded by using the structure shown in FIG. 11d. As shown in FIG. 12b, three modules are connected in parallel to each other by using the structure shown in FIG. 11b, and then two branches can achieve series-parallel switching by using the structure shown in FIG. 11c. As shown in FIG. 12c, two modules are connected in parallel to each other by using the structure shown in FIG. 11b, and then three branches are cascaded by using the structure shown in FIG. 11d. Other combinations are not described redundantly herein. All the implementations fall within the scope of protection of the present disclosure. The number of inputs is not limited, and is determined according to the actual situation. All the implementations fall within the scope of protection of the present disclosure.

It should be noted that in any one of the above embodiments, each low-voltage rectifying unit is ensured to be directly coupled to a corresponding high-voltage conversion unit, but power between the high-voltage conversion units is not ensured to be balanced. Therefore, in practices, in a case that at least one low-voltage rectifying unit in each of the module units is connected to a corresponding low-voltage rectifying unit in each of other module units through the bus at the output end, at least one secondary winding in each multi-winding transformer is indirectly connected to a secondary winding in each of other multi-winding transformers through a corresponding low-voltage rectifying unit and the bus. Therefore, by using the characteristics of the bus, energy balance for each high-voltage conversion unit and low-voltage rectifying unit can be achieved.

Figure 8A:
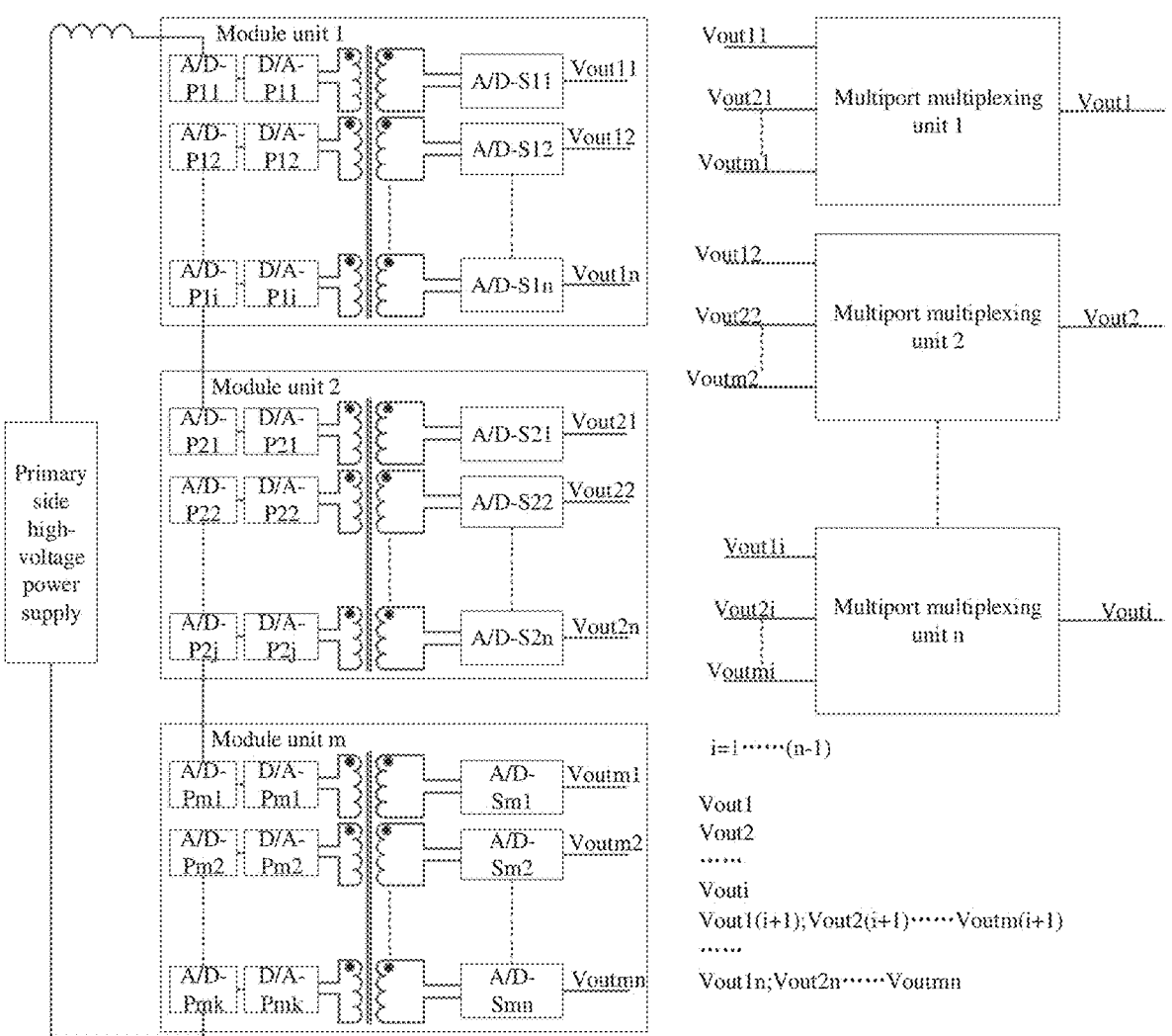
FIGS. 8a to 8d are schematic diagrams of a cascaded multi-port converter according to another embodiment of the present disclosure.

As shown in FIGS. 8a to 8d, FIG. 8a shows that some secondary windings are connected to the bus, and remaining secondary windings independently output. As shown in FIG. 8a, the output end Vout11, the output end Vout21, . . . and the output end Voutm1 are connected to a bus; the output end Vout12, the output end Vout22, . . . and an output end Voutm2 are connected to a bus; . . . ; an output end Vout1i, an output end Vout2i, . . . and an output end Voutm1 are connected to a bus. The remaining secondary windings independently output through respective connected low-voltage rectifying units. For example, an output end Vout1 (i+1), an output end Vout2(i+1), . . . , and an output end Voutm (i+1) independently output; an output end Vout1 (i+2), an output end Vout2 (i+2), . . . and an output end Voutm (i+2) independently output; . . . , and an output end Vout in, an output end Vout2n, . . . and an output end Voutmn independently output. Alternatively, each secondary winding is connected to a bus corresponding to the secondary winding (not shown), which is not described redundantly herein. All the implementations fall within the scope of protection of the present disclosure.

For example, each module unit is provided with four secondary windings, and each secondary winding corresponds to an independent low-voltage rectifying unit. Each module unit corresponds to output ends of four low-voltage rectifying units. In a case that in each module unit, some of the secondary windings of the module unit are connected through a bus, and the other secondary windings of the module unit independently output, three of the output ends are respectively connected to corresponding input ends of three multi-port multiplexing units, and a remaining output end of the module unit is connected to an output end of a corresponding multi-port multiplexing unit, so that at least one group of secondary windings are connected to each other through the bus, and at least one group of secondary windings independently output. In a case that in each module unit, each of the secondary windings of the module unit is connected to a secondary winding in each of other module units through a bus, the four output ends are respectively connected to corresponding input ends of the four multi-port multiplexing units, and output ends of other low-voltage rectifying units are respectively connected to corresponding input ends of the four multi-port multiplexing units, that is, for each module unit, four output ends of the low-voltage rectifying units corresponding to the module unit are respectively connected to four output ends of low-voltage rectifying units corresponding to each of other module units.

Figure 8B:
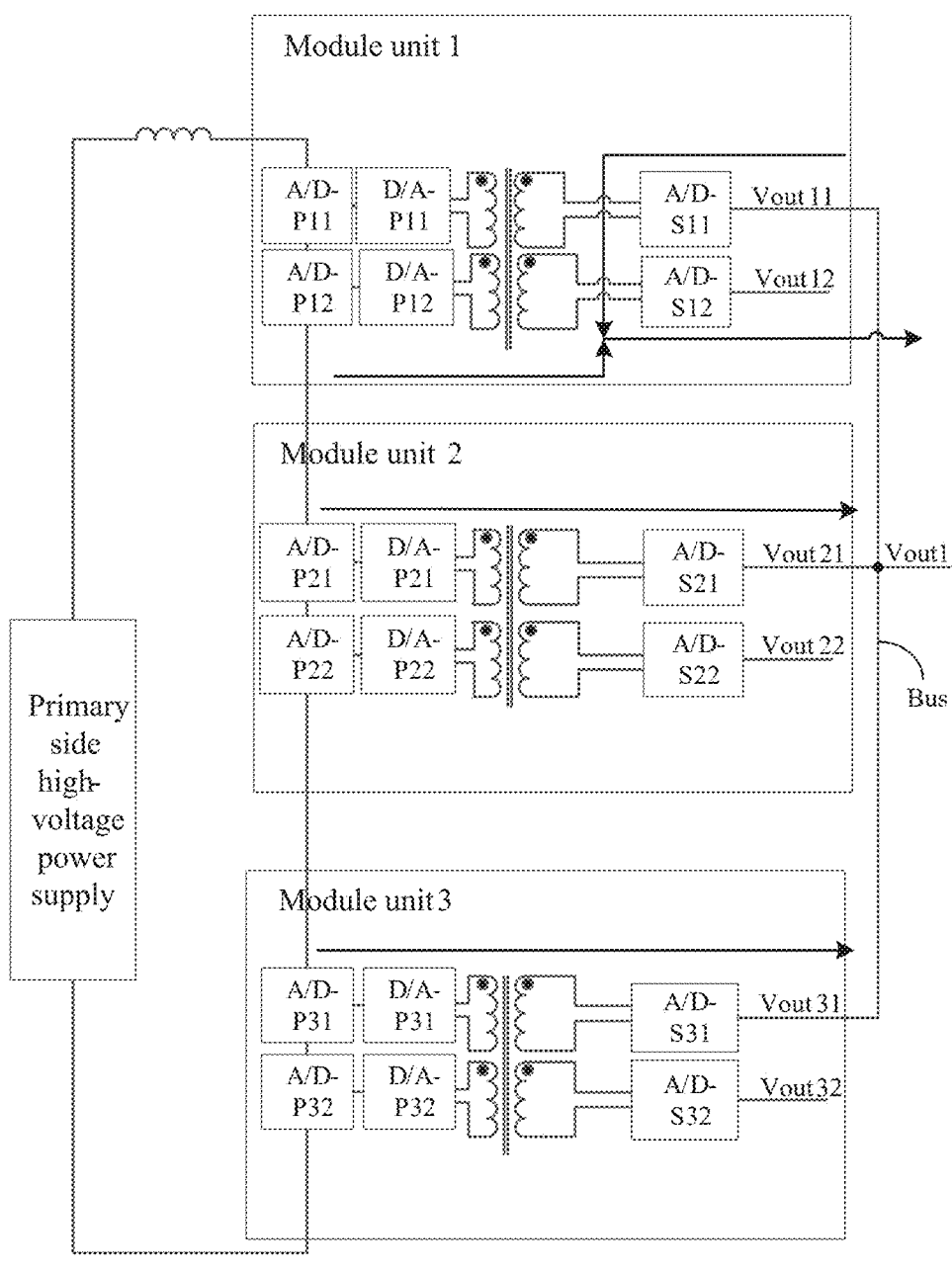

For ease of explanation, an example shown in FIG. 8b is used to illustrate how to achieve power balance.

As shown in FIG. 8b (showing that the number of secondary windings in each module unit is two and the number of module units is three), one secondary winding in the module unit 1 is connected to an AC side of the low-voltage rectifying unit A/D-S11, and the other secondary winding in the module unit 1 is connected to the AC side of the low-voltage rectifying unit A/D-S12. A DC side of the low-voltage rectifying unit A/D-S11 serves as an output end Vout11 of the low-voltage rectifying unit A/D-S11. A DC side of the low-voltage rectifying unit A/D-S12 serves as an output end Vout12 of the low-voltage rectifying unit A/D-S12. One secondary winding in the module unit 2 is connected to an AC side of a low-voltage rectifying unit A/D-S21, and the other secondary winding in the module unit 2 is connected to an AC side of the low-voltage rectifying unit A/D-S22. A DC side of the low-voltage rectifying unit A/D-S21 serves as an output end Vout21 of the low-voltage rectifying unit A/D-S21. A DC side of the low-voltage rectifying unit A/D-S22 serves as an output end Vout22 of the low-voltage rectifying unit A/D-S22. One secondary winding in the module unit 3 is connected to an AC side of the low-voltage rectifying unit A/D-S31, and the other secondary winding in the module unit 3 is connected to an AC side of the low-voltage rectifying unit A/D-S32. A DC side of the low-voltage rectifying unit A/D-S31 serves as an output end Vout31 of the low-voltage rectifying unit A/D-S31. A DC side of the low-voltage rectifying unit A/D-S32 serves as an output end Vout32 of the low-voltage rectifying unit A/D-S32.

The output end Vout11 of the low-voltage rectifying unit A/D-S11, the output end Vout21 of the low-voltage rectifying unit A/D-S21 and the output end Vout31 of the low-voltage rectifying unit A/D-S31 are connected to each other through the bus. That is, secondary windings in individual multi-winding transformers are indirectly connected to each other through corresponding low-voltage rectifying units and the bus. The output end Vout12 of the low-voltage rectifying unit A/D-S12, the output end Vout22 of the low-voltage rectifying unit A/D-S22 and the output end Vout32 of the low-voltage rectifying unit A/D-S32 output independently.

An arrow line in FIG. 8b indicates that an energy flow direction when only the output end Vout12 of the low-voltage rectifying unit A/D-S12 is required to output power. The high-voltage conversion unit of the module unit 2 and the high-voltage conversion unit of the module unit 3 each provide ⅓ of the power to the bus through respective low-voltage rectifying units connected to the bus, and then ⅔ of the power is transmitted to the output end Vout12 of the low-voltage rectifying unit A/D-S12 through the output end Vout11 of the module unit 1. The high-voltage conversion unit of the module unit 1 directly provides the other ⅓ of the power to the output end Vout12 of the low-voltage rectifying unit A/D-S12 to ensure the power balance between the high-voltage conversion units.

Figure 8C:
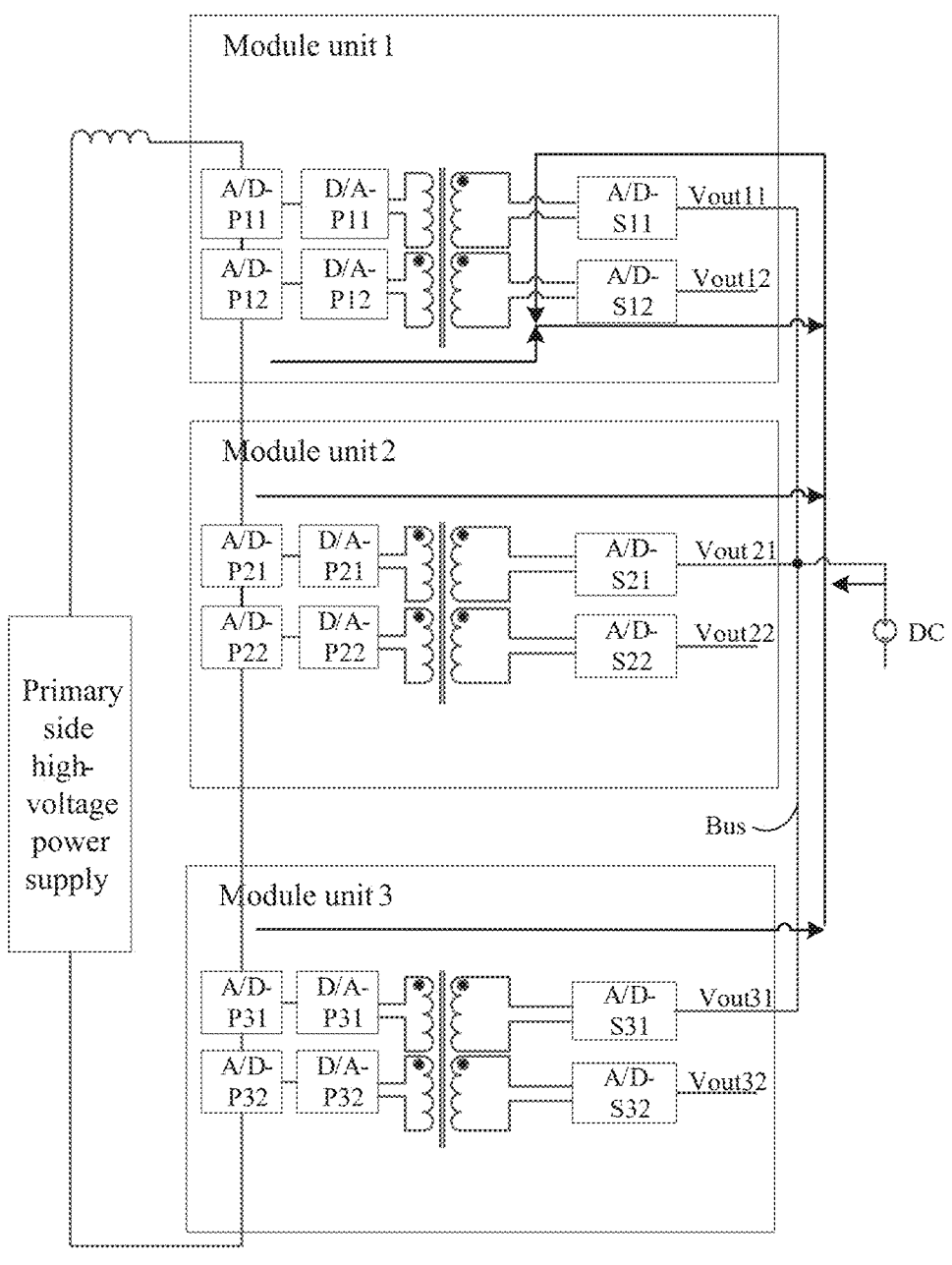
Figure 8D:
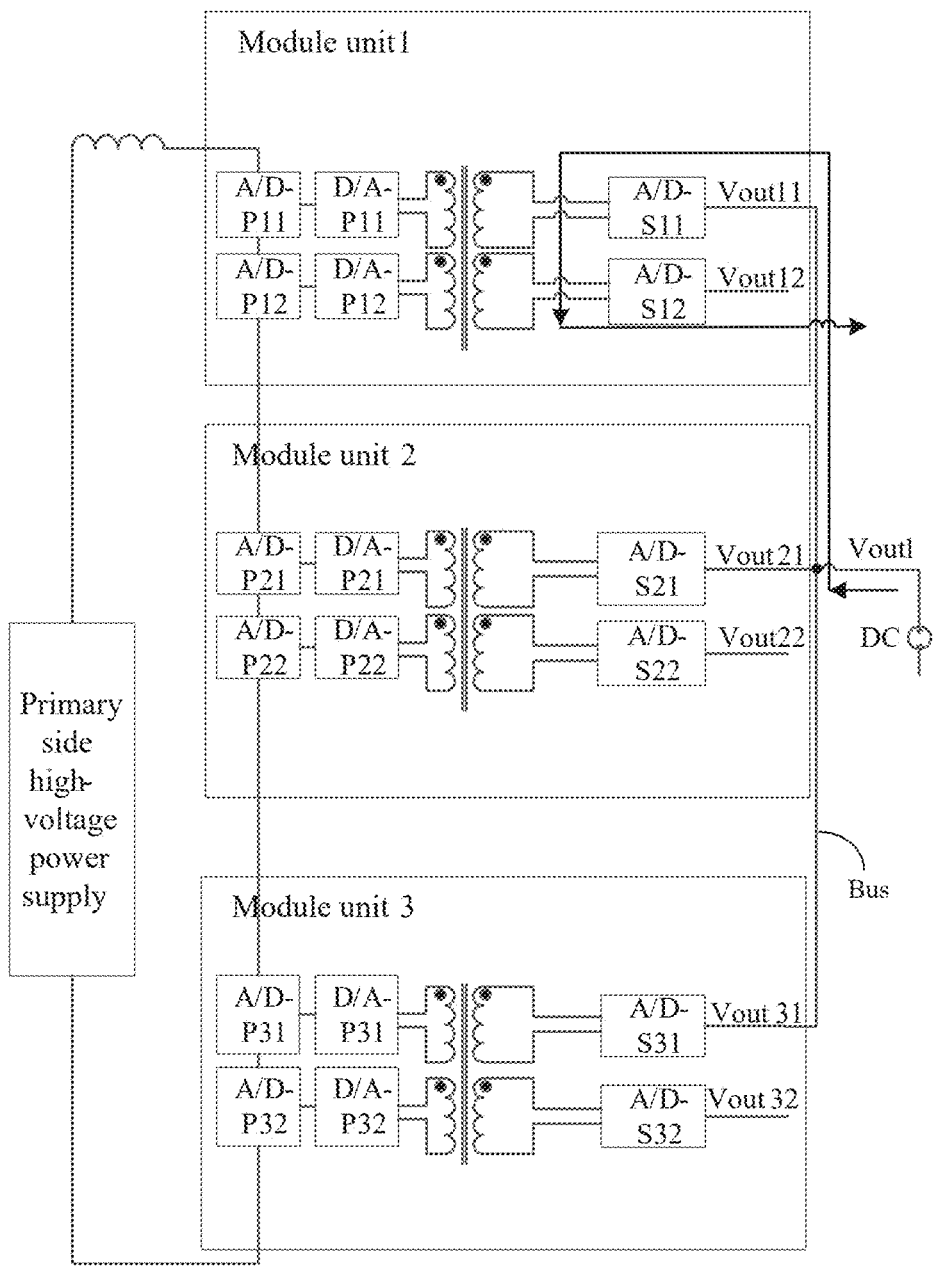

In practices, the secondary windings connected to each other through the bus may further be connected to an external power supply through the bus. As shown in FIGS. 8c and 8d, the output end Vout11 of the low-voltage rectifying unit A/D-S11, the output end Vout21 of the low-voltage rectifying unit A/D-S21, and the output end Vout31 of the low-voltage rectifying unit A/D-S31 are connected to a DC power supply DC through the bus.

As shown in FIG. 8c, a low-voltage bus, that is, the bus, is provided. In a case that external power is inputted, the high-voltage conversion units respectively provide the same power, and external power is provided through the bus at a low-voltage side to achieve power balance. As shown in FIG. 8d, in another embodiment, the high-voltage conversion units do not provide power, and the power independently outputted from the output end Vout12 is completely provided by the external power supply at the low-voltage side.

It should be noted that FIGS. 8a to 8c show some of the output ends connected to the bus, and the connection and operation principle of all output ends connected to a corresponding bus are similar to the descriptions in FIGS. 8a to 8c, which are not described redundantly herein. All the implementations fall within the scope of protection of the present disclosure.

It should be noted that the low-voltage rectifying unit is bidirectional. In the above descriptions, the AC side of the low-voltage rectifying unit is denoted as the input end and the DC side of the low-voltage rectifying unit is denoted as the output end.

In the embodiment, power between multiple groups of low-voltage rectifying units can be balanced by using the bus, so that power between the high-voltage conversion units can be balanced, and the system complexity and the number of the low-voltage rectifying units can be reduced. The common low-voltage bus provided for the system can provide convenience for other energy access, facilitate the realization of coupling such as optical storage and charging, and improve the multi-functionality of the system. At least one group of low-voltage rectifying units are connected to each other through a bus, and some low-voltage rectifying units of the at least one group of low-voltage rectifying units are independent from low-voltage rectifying units of other group of low-voltage rectifying units, so that the power between the high-voltage conversion units and the power between the low-voltage rectifying units can be balanced by using the feature of the bus.

Figure 15:
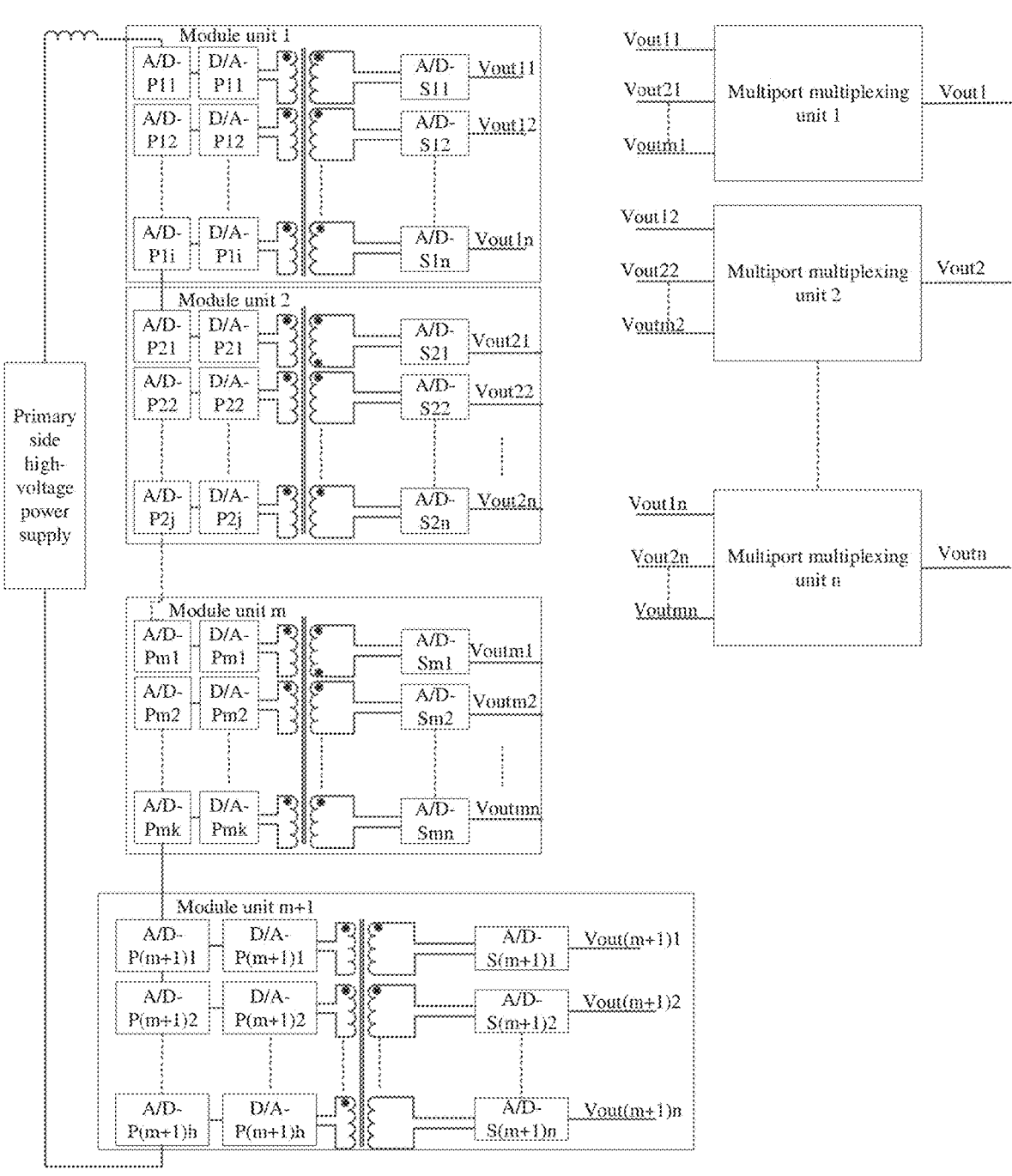
FIG. 15 is schematic diagram of a cascaded multi-port converter according to another embodiment of the present disclosure.

In addition, a case that at least one additional redundant module unit is not connected to other module units through an output end of a low-voltage rectifying unit does not excluded in practices. For example, a module unit m+1 is provided as shown in FIG. 15, which depends on the actual situation. All the implementations fall within the scope of protection of the present disclosure.

In the cascaded multi-port converter according to the embodiments of the present disclosure, at the low-voltage side, each multi-winding transformer provides a secondary winding for each low-voltage side, and an output at the low-voltage side corresponding to low-voltage rectifying units connected to each other through the bus is transmitted from the corresponding high-voltage conversion units through the multi-port multiplexing units. At the high-voltage side, each high-voltage conversion unit is connected to a primary winding of a multi-winding transformer corresponding to the high-voltage conversion unit, so as to ensure that power of multiple output ends (such as Vout1 to Vouti shown in FIGS. 3 to 6) at the low-voltage side comes from corresponding multiple high-voltage conversion units. In addition, multiple secondary windings are easily insulated to meet the insulation requirements, and at the low-voltage side, the low-voltage rectifying unit may independently control a total output voltage, or the low-voltage rectifying unit and the multi-port multiplexing unit may control the total output voltage.

Figure 13:
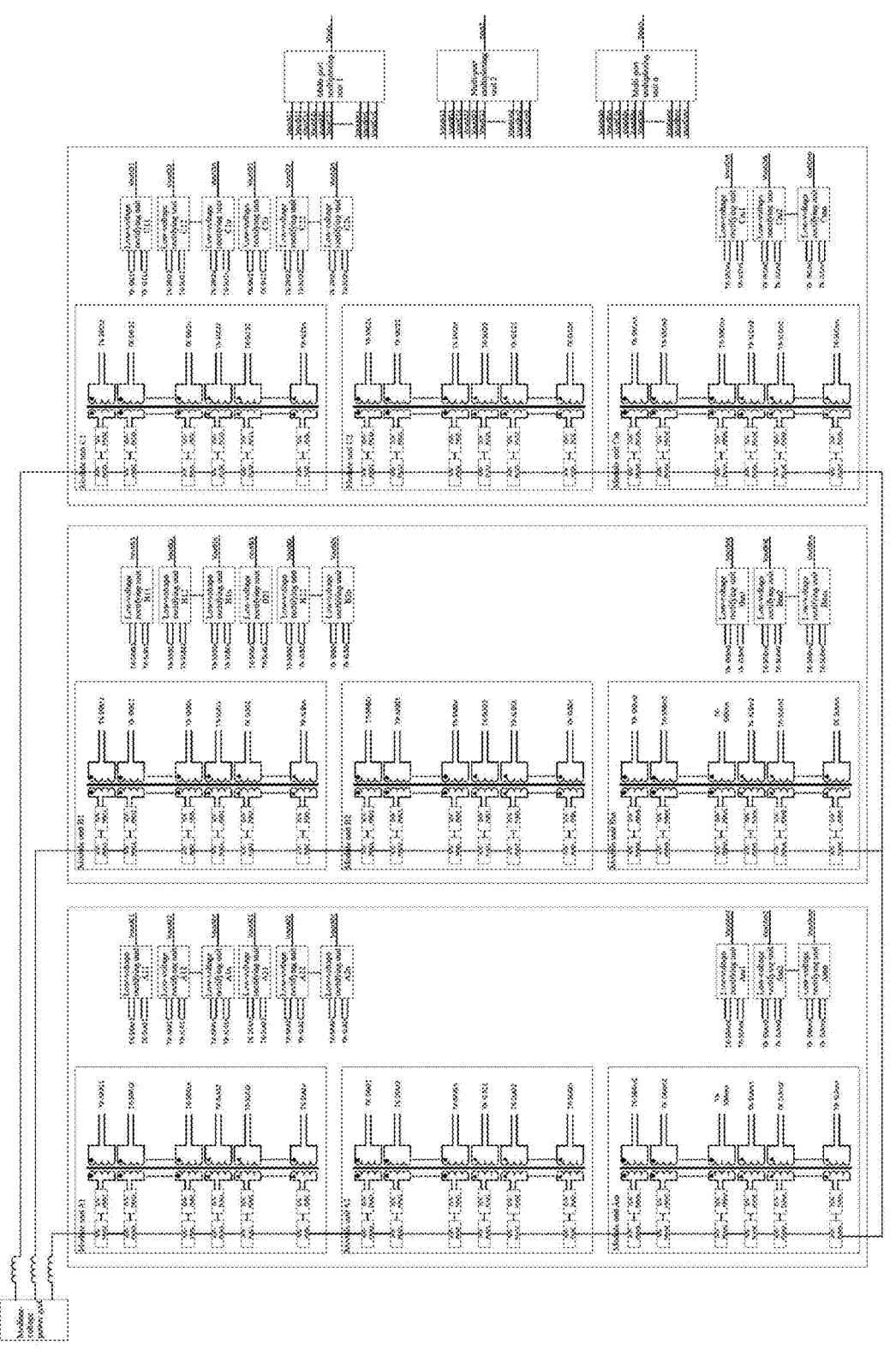
FIG. 13 is a schematic diagram of a three-phase medium-voltage input system according to an embodiment of the present disclosure.

A three-phase medium-voltage input system is provided according to an embodiment of the present disclosure. As shown in FIG. 13, the system includes three phase units, and each phase unit includes an inductor and the cascaded multi-port converter according to any one of the above embodiments of the present disclosure.

Head ends of input ends of the three phase units are directly connected to a medium-voltage power grid, and tail ends of the input ends of the three phase units are connected to each other. The three phase units adopt a same connection way, so that output power of each of the phase units at the low-voltage side is directly coupled with all units in the three-phase cascade system. In each phase unit, a head end of an input end of the cascaded multi-port converter is connected to an end of the inductor, another end of the inductor serves as a head end of an input end of the phase unit, and a tail end of the input end of the cascaded multi-port converter serves as a tail end of the input end of the phase unit.

In practices, in each phase unit, in a case that a low-voltage rectifying unit of the cascaded multi-port converter is connected to multiple secondary windings independent from each other, the low-voltage rectifying unit may be connected to secondary windings independent from each other in different phase units, or connected to secondary windings independent from each other in in one phase unit. For example, a first low-voltage rectifying unit is connected to a secondary winding in a first phase unit and a secondary winding in a second phase unit, and the two secondary windings are independent from each other, which are not repeated herein. As long as secondary windings connected to one low-voltage rectifying unit are independent from each other, whether the secondary windings are in one phase unit or in one multi-winding transformer is not limited herein. The connection of the low-voltage rectifying units depends on the actual situation. All the implementations fall within the scope of protection of the present disclosure.

It should be noted that all cascaded multi-port converters may share one multi-port multiplexing unit, or the cascaded multi-port converters may be provided with respective multi-port multiplexing units.

In practices, the cascaded multi-port converters may be a same structure or different structures. FIG. 13 only shows an example of the structure, and the cascaded multi-port converters may further be in other structures based on the above embodiments.

For the structure and the operation principle of the cascaded multi-port converter, reference is made to the above embodiment for details, which is not repeated herein. All the implementations fall within the scope of protection of the present disclosure. It should be noted that the cascaded multi-port converter may further be applied to other systems, which is not repeated herein. All the implementations fall within the scope of protection of the present disclosure.

In the embodiment, multiple secondary windings independent from each other share one low-voltage rectifying unit, to reduce the number of the low-voltage rectifying units, thereby reducing the complexity and cost of the three-phase medium-voltage input system, so that the three-phase medium-voltage input system has a high power density, low cost and high efficiency.

Figure 14:
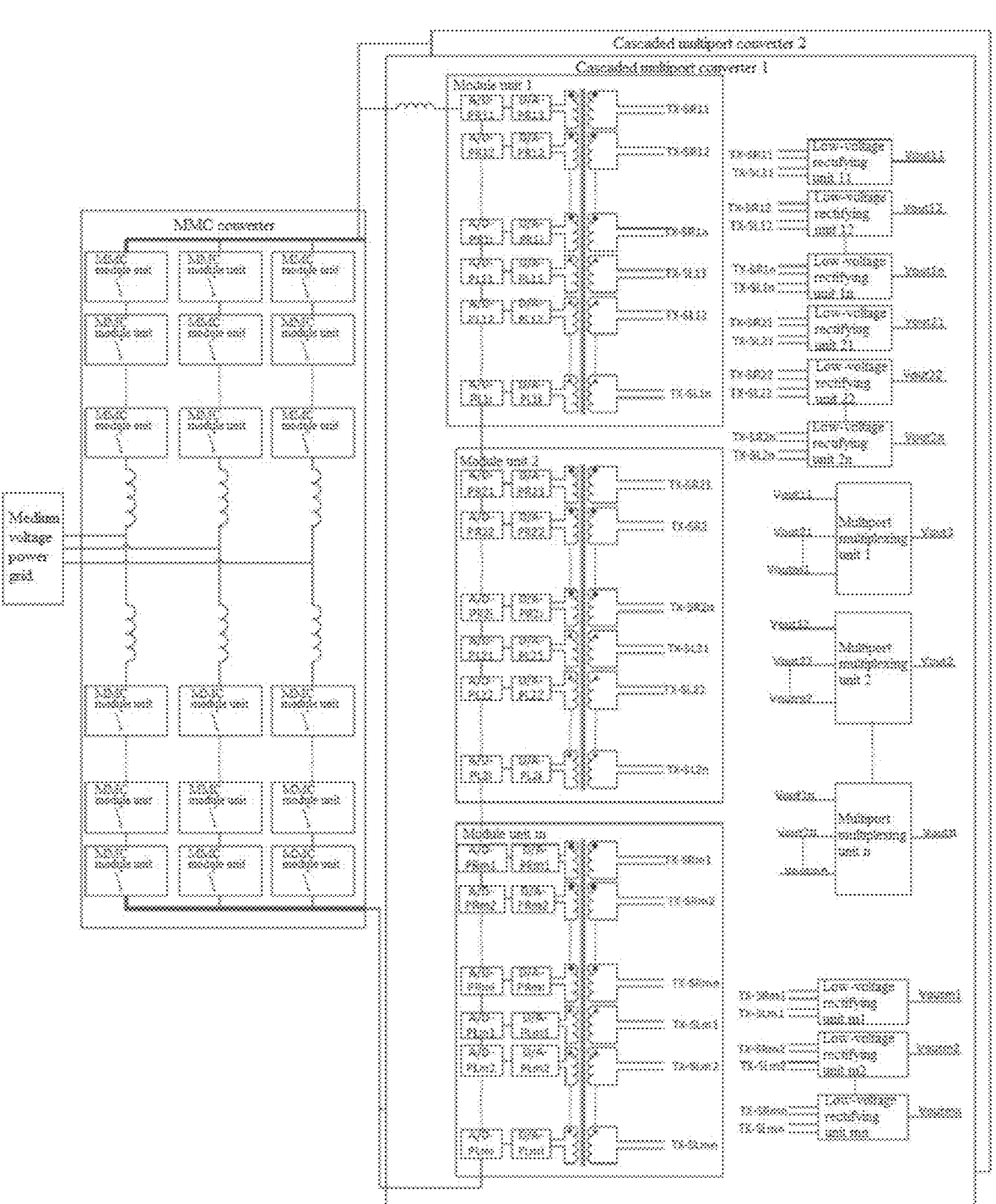
FIG. 14 is a schematic diagram of a three-phase medium-voltage input system according to another embodiment of the present disclosure.

A three-phase medium-voltage input system is provided according to an embodiment of the present disclosure. As shown in FIG. 14, the system includes an modular multilevel converter (MMC) and N DC conversion units. Each of the DC conversion units includes an inductor and the cascaded multi-port converter according to any one of the above embodiments of the present disclosure. N represents a positive integer.

Head ends of the input ends of the DC conversion units are connected to a positive electrode of a DC side of the MMC, and tail ends of the input ends of the DC conversion units are connected to a negative electrode of the DC side of the MMC. An AC side of the MMC is connected to the medium-voltage power grid.

In each of the DC conversion units, a head end of an input end of the cascaded multi-port converter is connected to an end of the inductor, another end of the inductor serves as a head end of an input end of the DC conversion unit, and a tail end of the input end of the cascaded multi-port converter serves as a tail end of the input end of the DC conversion unit.

It should be noted that the input ends of the DC conversion units are connected to the medium-voltage power grid through the MMC. That is, the MMC generates a high-voltage DC bus at the high-voltage side, the low-voltage DC power supply with at least two ports isolated from each other can perform energy exchange in a cascade manner through the high-voltage DC bus, and the multiple ports can achieve direct energy coupling.

A first AC/DC converter of the cascaded multi-port converter in the DC conversion unit is replaced by two straight lines.

In practices, in each DC conversion unit, in a case that a low-voltage rectifying unit of the cascaded multi-port converter is connected to multiple secondary windings independent from each other, the low-voltage rectifying unit may be connected to secondary windings independent from each other in different DC conversion units, or connected to secondary windings independent from each other in in one DC conversion unit. For example, a first low-voltage rectifying unit is connected to a secondary winding in a first DC converter unit and a secondary winding in a second DC converter unit, and the two secondary windings are independent from each other, which are not repeated herein. As long as secondary windings connected to one low-voltage rectifying unit are independent from each other, whether the secondary windings are in one DC converter unit, or in one multi-winding transformer is not limited herein. The connection of the low-voltage rectifying units depends on the actual situation. All the implementations fall within the scope of protection of the present disclosure.

It should be noted that all cascaded multi-port converters may share one multi-port multiplexing unit, or the all cascaded multi-port converters may be provided with respective multi-port multiplexing units.

In practices, the cascaded multi-port converters may be a same structure or different structures. FIG. 14 only shows an example of the structure, and the cascaded multi-port converters may further be in other structures based on the above embodiments.

For the structure and the operation principle of the cascaded multi-port converter, reference is made to the above embodiment for details, which is not repeated herein. All the implementations fall within the scope of protection of the present disclosure. It should be noted that the cascaded multi-port converter may further be applied to other systems, which is not repeated herein. All the implementations fall within the scope of protection of the present disclosure.

In the embodiment, multiple secondary windings independent from each other share one low-voltage rectifying unit, to reduce the number of the low-voltage rectifying units, thereby reducing the complexity and cost of the N-phase medium-voltage input system, so that the three-phase medium-voltage input system has a high power density, low cost and high efficiency.

Features described in each embodiment in the present disclosure may be replaced or combined with each other, reference can be made to similar parts among the embodiments, and each embodiment mainly focuses on an aspect different from other embodiments. The systems or the systems disclosed in the embodiment corresponds to the method disclosed in the embodiment, and is described relatively simply. For detailed description of the system, reference may be made to the related description of the method. The systems or the systems disclosed in the embodiment described are only schematic, in which units described as separate components may or may not be physically separated, and components displayed as units may or may not be physical units, that is, they may be located in one place or distributed over multiple network units. Some or all modules may be selected according to the actual requirements to realize the objective of the embodiment. Those skilled in the art can understand and implement without any creative work.

It may be known by those skilled in the art that, units and steps in each method described in conjunction with the embodiments disclosed herein can be realized by electronic hardware, computer software or a combination thereof. In order to clearly illustrate interchangeability of the hardware and the software, steps and composition of each embodiment have been described generally in view of functions in the above specification. Whether the function is executed in a hardware way or in a software way depends on application of the technical solution and design constraint condition. Those skilled in the art can use different method for each application to realize the described function, and this is not considered to be beyond the scope of the application.

The above illustration of the disclosed embodiments enables those skilled in the art to implement or practice the present disclosure. Many changes to these embodiments are apparent for those skilled in the art, and general principles defined herein can be implemented in other embodiments without departing the spirit or scope of the present disclosure. Hence, the present disclosure is not limited to the embodiments disclosed herein, but is to conform to the widest scope consistent with principles and novel features disclosed herein.

The invention claimed is:

1. A cascaded multi-port converter, comprising: a plurality of module units and a plurality of low-voltage rectifying units, wherein each of the plurality of module units comprises at least one multi-winding transformer and a plurality of high-voltage conversion units;

input ends of the plurality of module units are cascaded, and two terminals of the cascaded module units serve as two ports of an input end of the cascaded multi-port converter;

in each of the plurality of module units: input ends of the plurality of high-voltage conversion units are cascaded, two terminals of the cascaded high-voltage conversion units serve as two ports of an input end of said module unit, a magnetic core of a multi-winding transformer is wound with a plurality of primary windings and at least one secondary winding, an output end of each of the plurality of high-voltage conversion units is connected to a corresponding primary winding, and the secondary winding is connected to an input end of a corresponding low-voltage rectifying unit;

the number of the plurality of low-voltage rectifying units is less than the number of all secondary windings, and a plurality of secondary windings independent from each other share one of the plurality of low-voltage rectifying units, wherein the plurality of secondary windings independent from each other do not affect each other during operation.

2. The cascaded multi-port converter according to claim 1, wherein the plurality of secondary windings independent from each other comprise at least one of:

secondary windings of different multi-winding transformers; and secondary windings on different magnetic columns in one multi-winding transformer.

3. The cascaded multi-port converter according to claim 1, wherein the plurality of secondary windings independent from each other are connected in series to an input end of the shared low-voltage rectifying unit; or the plurality of secondary windings independent from each other are connected in parallel to the input end of the shared low-voltage rectifying unit.

4. The cascaded multi-port converter according to claim 1, wherein output ends of the corresponding low-voltage rectifying units are connected to each other through a bus, to ensure that at least one secondary winding in at least one multi-winding transformer is indirectly connected to a secondary winding in at least one of the other multi-winding transformers.

5. The cascaded multi-port converter according to claim 4, wherein at least one secondary winding in each multi-winding transformer is indirectly connected to a secondary winding in each of other multi-winding transformers through the corresponding low-voltage rectifying unit and the bus.

6. The cascaded multi-port converter according to claim 4, wherein
secondary windings connected to each other through the bus are connected to an external power supply through the bus.

7. The cascaded multi-port converter according to claim 4, wherein
in each of multi-winding transformers that are connected to the low-voltage rectifying units connected to each other through the bus, a secondary winding in each module unit is indirectly connected to a secondary winding in each of other multi-winding transformers through the bus.

8. The cascaded multi-port converter according to claim 4, further comprising at least one additional redundant module unit, wherein
each secondary winding of the redundant module unit independently outputs through a corresponding low-voltage rectifying unit.

9. The cascaded multi-port converter according to claim 1, further comprising a plurality of multi-port multiplexing units for combining inputs thereof in serial and/or parallel connection, wherein
input ends of each of the plurality of multi-port multiplexing units are respectively connected to output ends of different low-voltage rectifying units.

10. The cascaded multi-port converter according to claim 9, wherein at least one of the plurality of multi-port multiplexing units comprises:
a multi-input coupling branch; or
a multi-input coupling branch and a converter provided at a rear stage of the multi-input coupling branch.

11. The cascaded multi-port converter according to claim 10, wherein the multi-input coupling branch comprises at least one of:
a multi-input series structure, a multi-input parallel structure, and a multi-input series-parallel switching structure.

12. The cascaded multi-port converter according to claim 11, wherein
in a case that the multi-port multiplexing unit comprises the multi-input coupling branch and the converter provided at the rear stage of the multi-input coupling branch, and the multi-input coupling branch comprises the multi-input series-parallel switching structure, switches in the multi-input series-parallel switching structure are bidirectional switches.

13. The cascaded multi-port converter according to claim 12, wherein
in a case that the converter is an unidirectional converter, a bidirectional switch in the multi-input series-parallel switching structure connected to a positive electrode or a negative electrode of an input end of the multi-input series-parallel switching structure is replaced by a diode.

14. The cascaded multi-port converter according to claim 1, wherein a high-voltage conversion unit comprises a DC/AC converter and a first AC/DC converter, wherein
an AC side of the first AC/DC converter serves as an input end of the high-voltage conversion unit;
a DC side of the first AC/DC converter is connected to a DC side of the DC/AC converter;
an AC side of the DC/AC converter serves as an output end of the high-voltage conversion unit; and the first AC/DC converter is a full bridge structure, or a half bridge structure.

15. The cascaded multi-port converter according to claim 14, wherein each of the plurality of low-voltage rectifying units comprises a second AC/DC converter, wherein
an AC side of the second AC/DC converter serves as an input end of said low-voltage rectifying unit; and
a DC side of the second AC/DC converter serves as an output end of said low-voltage rectifying unit.

16. The cascaded multi-port converter according to claim 15, wherein the DC/AC converter and the second AC/DC converter through a corresponding winding form one of:
a double active bridge structure, an inductor-inductor-capacitor (LLC) structure, and a capacitor-inductor-inductor-capacitor (CLLC) structure.

17. A three-phase medium-voltage input system, comprising three phase units, and each of the three phase units comprising an inductor and a cascaded multi-port converter, wherein
the cascaded multi-port converter comprises: a plurality of module units and a plurality of low-voltage rectifying units;
each of the plurality of module units comprises at least one multi-winding transformer and a plurality of high-voltage conversion units;
input ends of the plurality of module units are cascaded, and two terminals of the cascaded module units serve as two ports of an input end of the cascaded multi-port converter;
in each of the plurality of module units: input ends of the plurality of high-voltage conversion units are cascaded, two terminals of the cascaded high-voltage conversion units serve as two ports of an input end of said module unit, a magnetic core of a multi-winding transformer is wound with a plurality of primary windings and at least one secondary winding, an output end of each of the plurality of high-voltage conversion units is connected to a corresponding primary winding, and the secondary winding is connected to an input end of a corresponding low-voltage rectifying unit;
head ends of input ends of the three phase units are connected to a medium-voltage power grid;
tail ends of the input ends of the three phase units are connected to each other; and
for each of the three phase units, a head end of an input end of the cascaded multi-port converter is connected to an end of the inductor, another end of the inductor serves as a head end of an input end of said phase unit, and a tail end of the input end of the cascaded multi-port converter serves as a tail end of the input end of said phase unit.

18. A three-phase medium-voltage input system, comprising an modular multilevel converter (MMC), and N direct-current conversion units, each of the N direct-current conversion units comprising an inductor and a cascaded multi-port converter, and N representing a positive integer, wherein
the cascaded multi-port converter comprises: a plurality of module units and a plurality of low-voltage rectifying units;
each of the plurality of module units comprises at least one multi-winding transformer and a plurality of high-voltage conversion units;
input ends of the plurality of module units are cascaded, and two terminals of the cascaded module units serve as two ports of an input end of the cascaded multi-port converter;

in each of the plurality of module units: input ends of the plurality of high-voltage conversion units are cascaded, two terminals of the cascaded high-voltage conversion units serve as two ports of an input end of said module unit, a magnetic core of a multi-winding transformer is wound with a plurality of primary windings and at least one secondary winding, an output end of each of the plurality of high-voltage conversion units is connected to a corresponding primary winding, and the secondary winding is connected to an input end of a corresponding low-voltage rectifying unit;

head ends of input ends of the N direct-current conversion units are connected to a positive electrode of a DC side of the MMC;

tail ends of the input ends of the N direct-current conversion units are connected to a negative electrode of the DC side of the MMC;

an AC side of the MMC is connected to a medium-voltage power grid;

for each of the N direct-current conversion units, a head end of an input end of the cascaded multi-port converter is connected to an end of the inductor, another end of the inductor serves as a head end of an input end of said direct-current conversion unit, and a tail end of the input end of the cascaded multi-port converter serves as a tail end of the input end of said direct-current conversion unit; and a first AC/DC converter of the cascaded multi-port converter in said direct-current conversion unit is replaced by two straight lines.

\* \* \* \* \*